(12) United States Patent
Satou et al.

(10) Patent No.: US 12,041,382 B2
(45) Date of Patent: *Jul. 16, 2024

(54) IMAGING DEVICE, IMAGING SYSTEM, VEHICLE RUNNING CONTROL SYSTEM, AND IMAGE PROCESSING DEVICE

(71) Applicant: Panasonic Intellectual Property Management Co., Ltd., Osaka (JP)

(72) Inventors: Yoshiaki Satou, Kyoto (JP); Kazuko Nishimura, Kyoto (JP); Yasuo Miyake, Osaka (JP); Osamu Shibata, Kanagawa (JP); Hiroshi Iwai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

This patent is subject to a terminal disclaimer.

(21) Appl. No.: 17/982,057

(22) Filed: Nov. 7, 2022

(65) Prior Publication Data

US 2023/0060498 A1 Mar. 2, 2023

Related U.S. Application Data

(63) Continuation of application No. 17/070,241, filed on Oct. 14, 2020, now Pat. No. 11,528,424, which is a
(Continued)

(30) Foreign Application Priority Data

May 26, 2017 (JP) .................................. 2017-104721

(51) Int. Cl.
*H04N 5/33* (2023.01)
*G03B 7/16* (2021.01)
(Continued)

(52) U.S. Cl.
CPC ................. *H04N 5/33* (2013.01); *G03B 7/16* (2013.01); *G03B 11/045* (2013.01);
(Continued)

(58) Field of Classification Search
CPC .......... H04N 5/33; H04N 23/10; H04N 23/60; H04N 23/73; H04N 23/74; H04N 23/76;
(Continued)

(56) References Cited

U.S. PATENT DOCUMENTS 10,368,053 B2 * 7/2019 Martinez Bauza .... G01B 11/25
2007/0103585 A1 * 5/2007 Takeuchi .............. G06T 3/4007
348/441

(Continued)

FOREIGN PATENT DOCUMENTS

JP  2001-202497 A   7/2001
JP  2003-296659 A  10/2003
(Continued)

OTHER PUBLICATIONS

Notice of Allowance issued in U.S. Appl. No. 15/985,951, dated Nov. 27, 2019.
(Continued)

*Primary Examiner* — Asghar H Bilgrami
(74) *Attorney, Agent, or Firm* — Rimon P.C.

(57) ABSTRACT

An imaging device including a first filter that passes a first light and a second light; a second filter that blocks the second light; photoelectric converters that have sensitivity to the first light and the second light; and a processor, in which one of the photoelectric converters detects a light passing through the first filter to generate a first signal, one of the photoelectric converters detects a light passing through the first filter and the second filter to generate a second signal, and the processor performs the second light sensing based on the first signal and the second signal.

13 Claims, 25 Drawing Sheets

Related U.S. Application Data continuation of application No. 16/802,501, filed on Feb. 26, 2020, now Pat. No. 10,841,505, which is a continuation of application No. 15/985,951, filed on May 22, 2018, now Pat. No. 10,616,495.

(51) Int. Cl.

| | | |
|---|---|---|
| *G03B 11/04* | (2021.01) | |
| *G06V 10/143* | (2022.01) | |
| *G06V 10/147* | (2022.01) | |
| *G06V 10/50* | (2022.01) | |
| *G06V 10/60* | (2022.01) | |
| *G06V 20/56* | (2022.01) | |
| *G06V 20/59* | (2022.01) | |
| *G06V 30/224* | (2022.01) | |
| *G06V 40/16* | (2022.01) | |
| *H04N 23/10* | (2023.01) | |
| *H04N 23/60* | (2023.01) | |
| *H04N 23/73* | (2023.01) | |
| *H04N 23/74* | (2023.01) | |
| *H04N 23/76* | (2023.01) | |

(52) U.S. Cl.
CPC .......... *G06V 10/143* (2022.01); *G06V 10/147* (2022.01); *G06V 10/50* (2022.01); *G06V 10/60* (2022.01); *G06V 20/588* (2022.01); *G06V 20/597* (2022.01); *G06V 30/224* (2022.01); *G06V 40/168* (2022.01); *H04N 23/10* (2023.01); *H04N 23/60* (2023.01); *H04N 23/73* (2023.01); *H04N 23/74* (2023.01); *H04N 23/76* (2023.01)

(58) Field of Classification Search
CPC ...... G03B 7/16; G03B 11/045; G06V 10/143; G06V 10/147; G06V 10/50; G06V 10/60; G06V 20/588; G06V 20/597; G06V 30/224; G06V 40/168
See application file for complete search history.

(56) References Cited

U.S. PATENT DOCUMENTS

| | | | |
|---|---|---|---|
| 2009/0033588 A1 | 2/2009 | Kajita et al. | |
| 2010/0091096 A1 | 4/2010 | Oikawa et al. | |
| 2010/0149091 A1* | 6/2010 | Kota | G06T 11/00 345/156 |
| 2013/0201334 A1* | 8/2013 | C | G06K 9/00818 348/148 |
| 2014/0168458 A1* | 6/2014 | Richards | G06T 3/40 348/222.1 |
| 2015/0138310 A1* | 5/2015 | Fan | G06K 9/00201 348/36 |
| 2015/0237246 A1 | 8/2015 | Omi | |
| 2016/0364825 A1* | 12/2016 | Pan | H04N 19/136 |

FOREIGN PATENT DOCUMENTS

| | | |
|---|---|---|
| JP | 2007-163367 A | 6/2007 |
| JP | 2008-252327 A | 10/2008 |
| JP | 2009-037487 A | 2/2009 |
| JP | 2009-163714 A | 7/2009 |
| JP | 2010-092436 A | 4/2010 |
| JP | 2012-221303 A | 11/2012 |
| JP | 2014-075637 A | 4/2014 |
| JP | 2014-093700 A | 5/2014 |
| JP | 2016-004134 A | 1/2016 |

OTHER PUBLICATIONS

Non-Final Office Action issued U.S. Appl. No. 16/802,501, dated Apr. 16, 2020.

Notice of Allowance issued U.S. Appl. No. 16/802,501, dated Jul. 24, 2020.

Notice of Allowance issued U.S. Appl. No. 17/070,241, dated Aug. 10, 2022.

* cited by examiner

IMAGING DEVICE, IMAGING SYSTEM, VEHICLE RUNNING CONTROL SYSTEM, AND IMAGE PROCESSING DEVICE

CROSS-REFERENCE OF RELATED APPLICATIONS

This application is a Continuation of U.S. patent application Ser. No. 17/070,241, filed on Oct. 14, 2020, which is a Continuation of U.S. patent application Ser. No. 16/802,501, filed on Feb. 26, 2020, now U.S. Pat. No. 10,841,505, which is a Continuation of U.S. patent application Ser. No. 15/985,951, filed on May 22, 2018, now U.S. Pat. No. 10,616,495, which in turn claims the benefit of Japanese Application No. 2017-104721, filed on May 26, 2017, the entire disclosures of which applications are incorporated by reference herein.

BACKGROUND

1. Technical Field

The present disclosure relates to an imaging device, an imaging system, a vehicle running control system, and an image processing device.

2. Description of the Related Art

An image reading scheme has been known as a method for acquiring information by means of an imaging device. The image reading scheme is a technique for acquiring information from a one-dimensional or two-dimensional code typified by a bar code or a QR code (registered trademark). This scheme makes it possible to acquire information from one shot image. Further, this scheme also makes it possible to acquire information from a plurality of codes that are present in one image. As such, this method is useful in acquiring image while a target such as a vehicle is in motion and exercising control or making a determination on the basis of the information thus acquired. For example, there have been proposed methods for controlling a vehicle by means of information obtained from a code displayed on a tail light or a signal (see, for example, Japanese Unexamined Patent Application Publication No. 2012-221303 and Japanese Unexamined Patent Application Publication No. 2014-93700).

SUMMARY

For the acquisition of information under the image reading scheme, it is desirable to be able to extract a code with high accuracy.

One non-limiting and exemplary embodiment provides the following.

In one general aspect, the techniques disclosed here feature an imaging device including a first filter that passes a first light and a second light; a second filter that blocks the second light; photoelectric converters that have sensitivity to the first light and the second light; and a processor, in which one of the photoelectric converters detects a light passing through the first filter to generate a first signal, one of the photoelectric converters detects a light passing through the second filter and the second filter to generate a second signal, and the processor performs the second light sensing based on the first signal and the second signal.

It should be noted that general or specific embodiments may be implemented as an element, a device, a module, a system, an integrated circuit, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
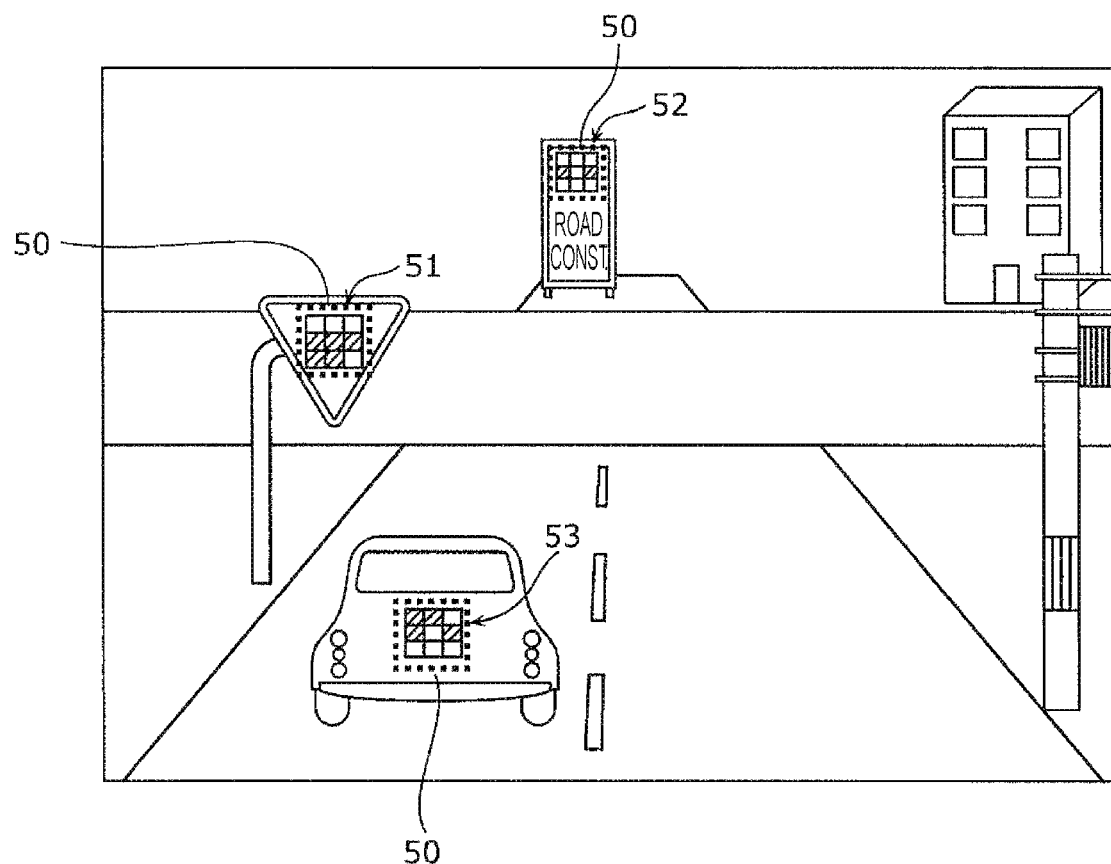
FIG. 1 is a diagram showing an example of an image containing codes displayed through infrared light according to a first embodiment.

Underlying Knowledge Forming Basis of the Present Disclosure

The acquisition of information under the image reading scheme faces the task of extracting a code with high accuracy. If a plurality of codes that are present in a shot image can be extracted with high accuracy and at high speed, it is useful to an ADAS (advanced driver assistance system) technology, an automated driving technology, or the like as automation of vehicle control or new means for providing information to an occupant.

The following is a brief overview of an aspect of the present disclosure.

An imaging device according to an aspect of the present disclosure includes: an imager that includes first pixels having sensitivity to visible light and second pixels having sensitivity to non-visible light, the imager acquiring first image data from the first pixels and acquiring second image data from the second pixels, each of the first image data and the second image data containing an image of an object that displays a code through non-visible light; and an image processor, wherein the image processor performs a correction process including a process of multiplying at least either the first image data or the second image data by a correction factor, generates third image data from a difference between a pair of image data obtained by the correction process, and extracts the code on the basis of the third image data.

With this, the imaging device generates the third image data through a difference process between the first image data taken of visible light and the second image data taken of non-visible light. This makes it possible to increase a contrast of the code in the third image data, thus allowing the imaging device to extract the code with high accuracy.

Further, this allows the imaging device to reduce a difference in signal intensity between the first image data and the second image data, thus making it possible to further increase the contrast of the code in the third image data. This allows the imaging device to extract the code with higher accuracy.

For example, the image processor may perform the correction process so that a signal intensity of an image other than the code in the second image data becomes higher than a signal intensity of an image other than the code in the first image data.

For example, a part of the object may emit non-visible light, and the object may display the code by emitting non-visible light from the part.

For example, a part of the object may be higher in reflectance with respect to non-visible light than with respect to visible light, and the object may display the code by reflecting non-visible light at the part.

For example, assuming that, in the second image data, a highest one of signal intensities of an image of the code is a first intensity and a highest one of signal intensities of an image other than the code is a second intensity and that, in the third image data, a highest one of signal intensities of an image of the code is a third intensity and a highest one of signal intensities of an image other than the code is a fourth intensity, a ratio of the third intensity to the fourth intensity may be higher than a ratio of the first intensity to the second intensity.

For example, the image processor may perform the correction process so that a difference between a signal intensity of an image other than the code in the first image data and a signal intensity of an image other than the code in the second image data becomes smaller.

This makes it possible to reduce a difference in signal intensity between the first image data and the second image data, thus making it possible to further increase the contrast of the code in the third image data. This allows the imaging device to extract the code with higher accuracy.

For example, the correction factor may be calculated on the basis of a first spectral sensitivity characteristic of the first pixels and a second spectral sensitivity characteristic of the second pixels.

For example, the correction factor may be calculated on the basis of a first characteristic obtained by multiplying the first spectral sensitivity characteristic by a sunlight spectrum and a second characteristic obtained by multiplying the second spectral sensitivity characteristic by the sunlight spectrum.

This makes it possible to further increase the contrast of the code in the third image data by taking a spectrum of sunlight into account. This allows the imaging device to extract the code with higher accuracy.

For example, the second pixels may have sensitivity to both of non-visible light and visible light.

For example, the imaging device may further includes a day-or-night determiner that determines whether it is daytime or nighttime, wherein in a case where the day-or-night determiner has determined that it is daytime, the image processor may extract the code on the basis of the third image data, and in a case where the day-or-night determiner has determined that it is nighttime, the image processor may extract the code on the basis of the second image data.

This makes it possible to reduce throughput of the imaging device in the nighttime, during which non-visible light contained in sunlight has a small effect.

For example, the image processor may acquire information associated with the code thus extracted. Further, for example, the information may include traffic information.

For example, the first pixels and the second pixels may be separate pixels.

This allows the imaging device to simultaneously acquire the first image data and the second image data. Accordingly, since the imaging device can reduce a discrepancy in image between the first image data and the second image data that occurs due to a motion, the imaging device can extract the code with higher accuracy.

For example, the first pixels may be identical to third pixels, the second pixels may be identical to the third pixels, the third pixels may have a first state in which the third pixels have sensitivity to visible light and a second state in which the third pixels have sensitivity to non-visible light, and the imager may acquire the first image data from the third pixels in the first state and may acquire the second image data from the third pixels in the second state.

This allows the imaging device to acquire the first image data and the second image data through identical pixels. Accordingly, the imaging device can do with a smaller number of pixels.

For example, timings of start and end of an exposure period in which the first pixels acquire the first image data may be the same as timings of start and end of an exposure period in which the second pixels acquire the second image data.

This allows the imaging device to reduce a distortion of an image of the code that occurs due to a motion and, therefore, to extract the code with higher accuracy.

For example, the imager may acquire the first image data and the second image data in each of frame periods, and the image processor may extract the code in a part of the frame periods and may not extract the code in the other part of the frame periods.

An imaging system according to an aspect of the present disclosure includes: the imaging device; and a notifier that notified a user of the information.

A vehicle running control system according to an aspect of the present disclosure includes: the imaging device; and a vehicle controller that controls braking and acceleration of a vehicle on the basis of the information.

An image processing device according to an aspect of the present disclosure includes: an image processor that extracts a code, which is displayed by an object through non-visible light, on the basis of a first image data and a second image data, the first image data containing a visible image of the object, the second image data containing a non-visible image of the object, wherein the image processor performs a correction process including a process of multiplying at least either the first image data or the second image data by a correction factor, generates third image data from a difference between a pair of image data obtained by the correction process, and extracts the code on the basis of the third image data.

With this, the image processing device generates the third image data through a difference process between the first image data taken of visible light and the second image data taken of non-visible light. This allows the image processing device to increase a contrast of the code in the third image data and, therefore, to extract the code with high accuracy.

For example, the image processor may acquire information associated with the code thus extracted.

It should be noted that general or specific embodiments may be implemented as a system, a method, an integrated circuit, a computer program, a computer-readable storage medium such as a CD-ROM, or any selective combination thereof.

The following gives a detailed description of embodiments of the present disclosure with reference to the drawings. It should be noted that each of the embodiments to be described below shows a general or specific example. The numerical values, the shapes, the materials, the constituent elements, the placement location and connection configuration of the constituent elements, the steps, the order of the steps, and the like that are shown in the following embodiments are mere examples and are not intended to limit the present disclosure. Various aspects that are described herein may be combined with each other unless a contradiction arises. Further, those of the constituent elements in the following embodiments which are not recited in an independent claim representing the most generic concept are described as optional constituent elements. In the following description, constituent elements having substantially the same functions are indicated by common reference signs, and a description of such constituent elements may be omitted. The term "image data" as used herein means data containing image information. Further, the term "image data" is sometimes simply denoted as "image".

First Embodiment

First, a configuration and operation of a vehicle running control system 100 according to a first embodiment are described.

The vehicle running control system 100 includes an imaging device 101 mounted on a vehicle. The imaging device 101 reads a code and acquires information associated with the code.

Figure 3:
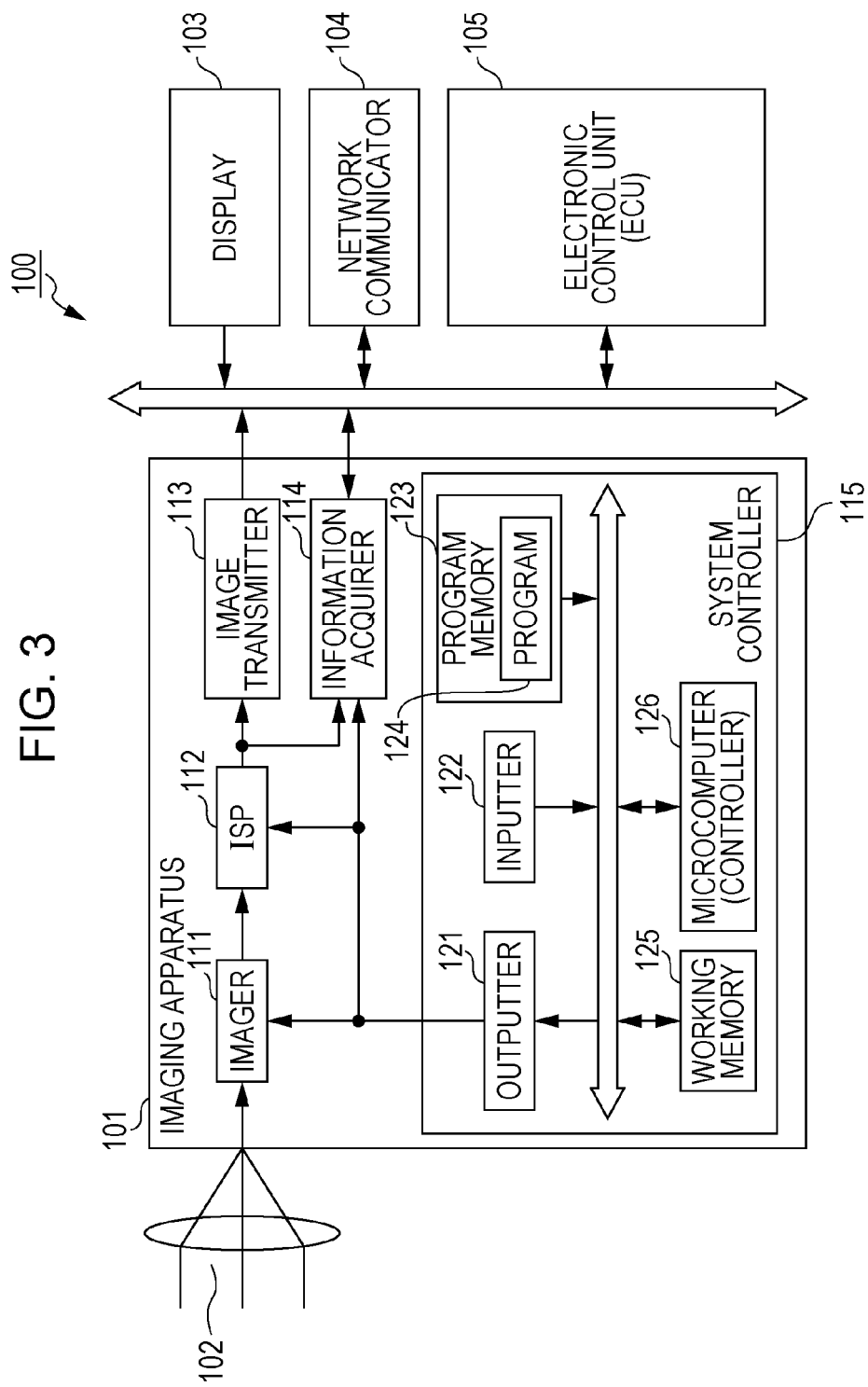
FIG. 3 is a diagram showing an example configuration of a vehicle running control system according to the first embodiment.

FIG. 3 is a diagram showing an example of a hardware configuration of the vehicle running control system 100 according to the first embodiment. As shown in FIG. 3, the vehicle running control system 100 includes the imaging device 101, an optical system 102, a display 103, a network communicator 104, and an ECU 105, which is an electronic control unit. The imaging device 101 includes an imager 111, an ISP 112, a system controller 115, an image transmitter 113, and an information acquirer 114. The ISP 112 is an image processing processor that performs image processing on output data from the imager 111. The system controller 115 controls how the ISP 112 performs image processing. The image transmitter 113 externally transmits data outputted from the ISP 112.

The optical system 102 has a well-known lens group. For example, a focus lens of the lens group may move along an optical axis. This allows the imager 111 to adjust the focus position of a subject image.

Figure 4:
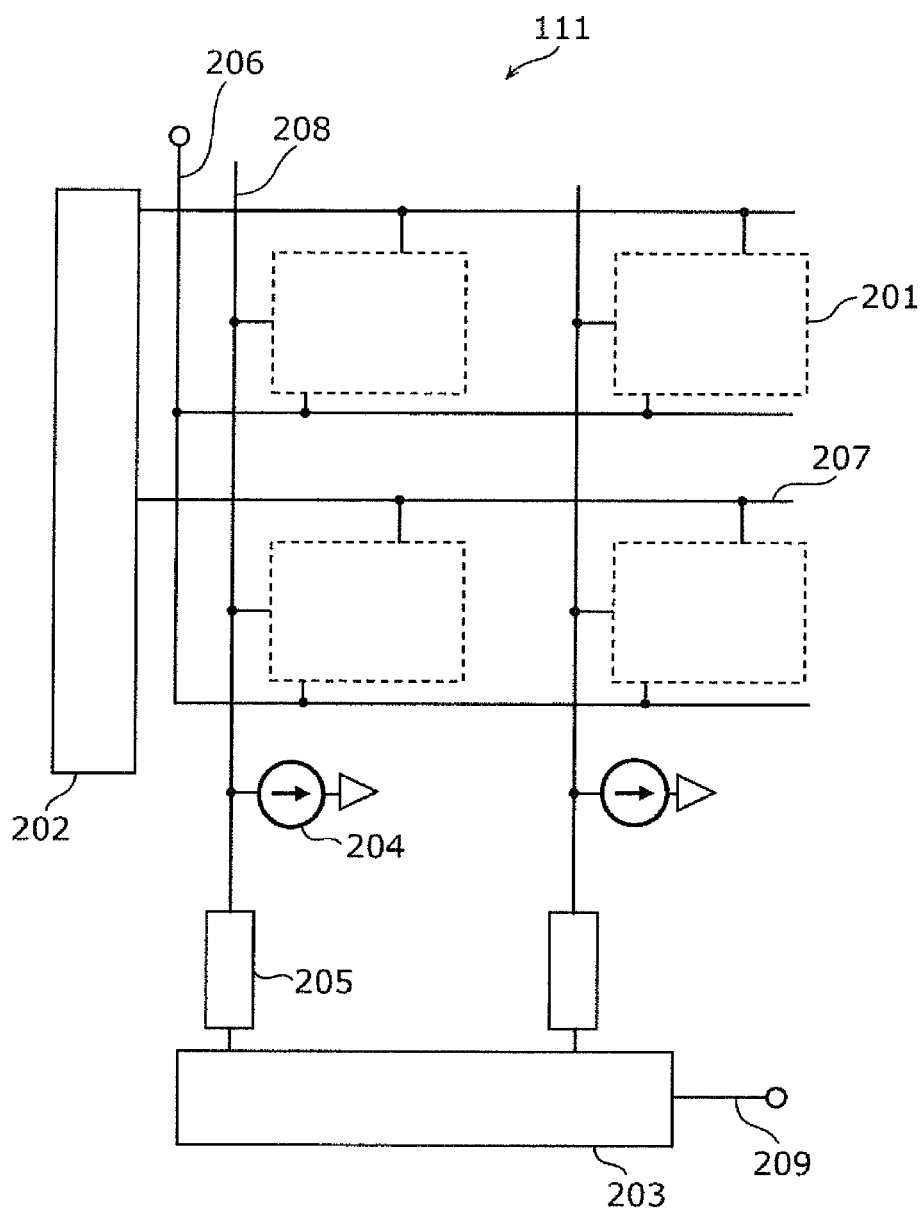
FIG. 4 is a diagram showing an example configuration of an imager according to the first embodiment.

An example of the imager 111 is a CMOS (complementary metal-oxide-semiconductor) image sensor. FIG. 4 is a diagram showing an example configuration of the imager 111. As shown in FIG. 4, the imager 111 includes a pixel array including a plurality of pixels 201 arranged in rows and columns, a row scanning circuit 202, a column scanning circuit 203, a current source 204 provided for each column, and an AD conversion circuit 205 provided for each column.

Each of the pixels 201 is connected to a horizontal signal line 207 of a corresponding row and to a vertical signal line 208 of the corresponding row. Each of the pixels 201 is individually selected by the row scanning circuit 202 and the column scanning circuit 203. Each of the pixels 201 is supplied with a power supply voltage from a common power supply line 206. Each of the pixels 201 converts an inputted optical signal into an electric signal. The AD conversion circuit 205 converts an electric signal formed by a pixel 201 into a digital signal. This digital signal is outputted from the column scanning circuit 203 to an output signal line 209. The AD conversion circuit 205 may be omitted so that the electrical signal may be outputted as an analog signal.

Alternatively, output signals from the plurality of pixels 201 may be added and subtracted so that a calculated value may be outputted.

Figure 5A:
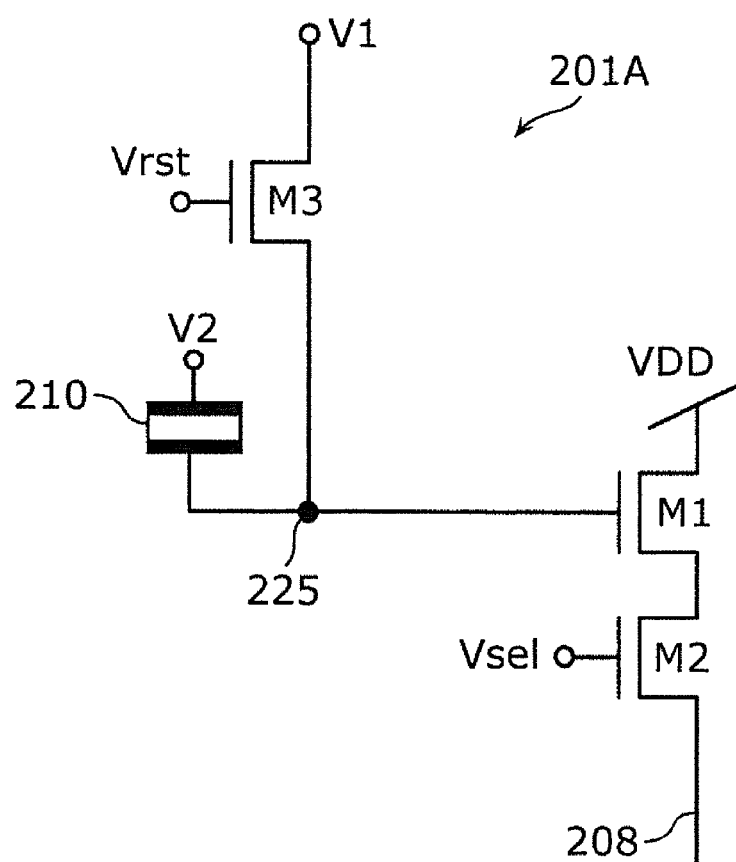
FIG. 5A is a diagram showing an example of a circuit configuration of a pixel according to the first embodiment.
Figure 5B:
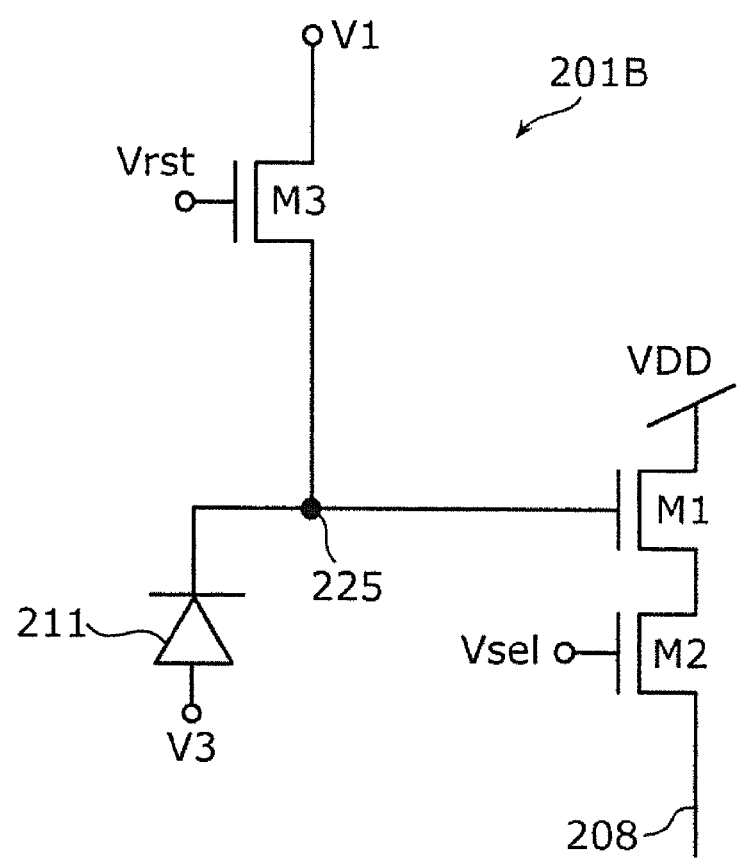
FIG. 5B is a diagram showing an example of a circuit configuration of a pixel according to the first embodiment.

FIGS. 5A and 5B are diagrams showing configurations of pixels 201A and 201B, respectively, which are examples of the pixels 201. As shown in FIG. 5A, the pixel 201A includes a photoelectric converter 210, a charge storage 225, a reset transistor M3, an amplification transistor M1, and a selection transistor M2. The photoelectric converter 210 converts incident light into charge. The charge storage 225 stores charge. The reset transistor M3 resets a potential of the charge storage 225 to a desired reset potential V1. The amplification transistor M1 outputs a signal corresponding to the amount of charge stored in the charger storage 225. The selection transistor M2 selectively outputs a signal to the vertical signal line 208.

As shown in FIG. 5B, a photodiode 211 may be used as a photoelectric converter.

Figure 6:
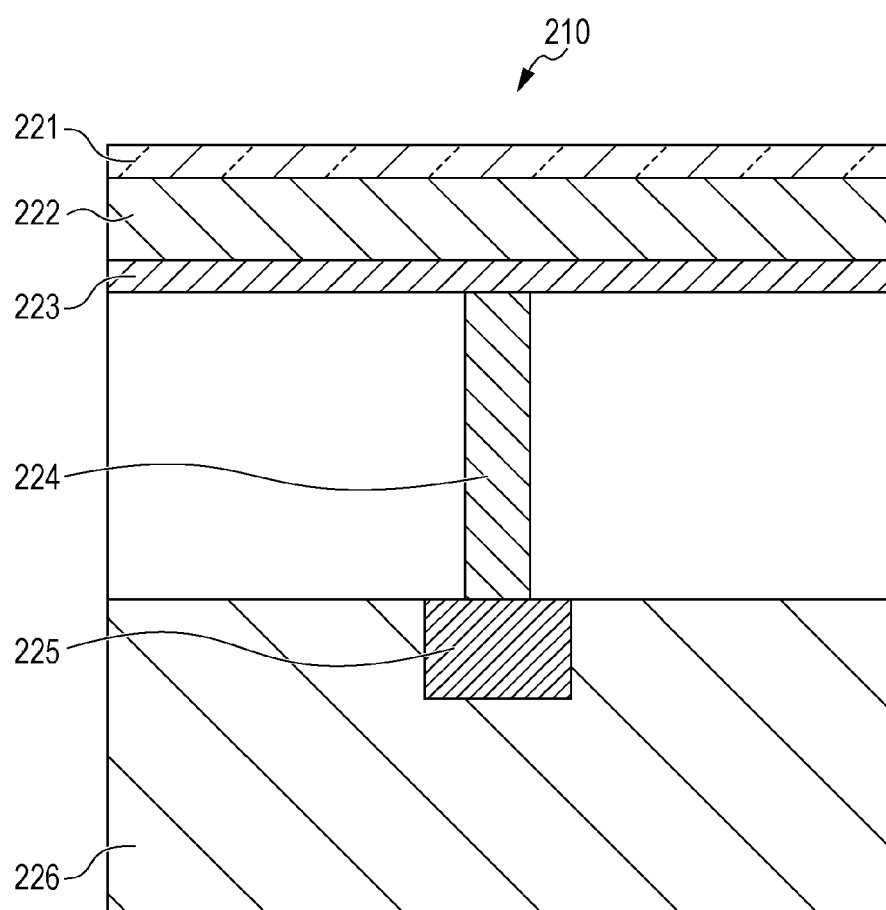
FIG. 6 is a cross-sectional view showing an example of a photoelectric converter according to the first embodiment.

FIG. 6 is a cross-sectional view showing an example configuration of the pixel 201A shown in FIG. 5A. As shown in FIG. 6, the photoelectric converter 210 has a transparent electrode 221, a pixel electrode 223, and a photoelectric conversion layer 222. The photoelectric conversion layer 222 is located between the transparent electrode 221 and the pixel electrode 223. At least a part of the charge storage 225 may be located within a semiconductor substrate 226. The charge storage 225 may be electrically connected to the pixel electrode 223 via a contact plug 224. The application of a bias voltage between the transparent electrode 221 and the pixel electrode 223 generates an electric field. This electric field causes either positive or negative charge generated by photoelectric conversion in the photoelectric conversion layer 222 to be collected by the pixel electrode 223. The charge thus collected is stored in the charge storage 225.

The pixels 201 have sensitivity to visible light or non-visible light. FIGS. 7A to 7D show examples of arrangements of pixels 201. Further, a case is illustrated where an example of non-visible light is infrared light. In FIGS. 7A to 7D, each quadrangular represents a single pixel. The letters "G", "R", "B", "IR", and "W" written in the respective pixels indicate that the respective pixels have sensitivity to a band of green wavelengths, a band of red wavelengths, a band of blue wavelengths, a band of wavelengths of infrared light, and a band of wavelengths of visible light to infrared light, respectively. In the following, the terms "G pixel", "R pixel", "B pixel", "IR pixel", and "W pixel" refer to a pixel that has sensitivity to a band of green wavelengths, a pixel that has sensitivity to a band of red wavelengths, a pixel that has sensitivity to a band of blue wavelengths, a pixel that has sensitivity to a band of wavelengths of infrared light, and a pixel that has sensitivity to a band of wavelengths of visible light to infrared light, respectively. The pixel array is a vertical and horizontal arrangement of the same configurations of single units each including four pixels.

Figure 7A:
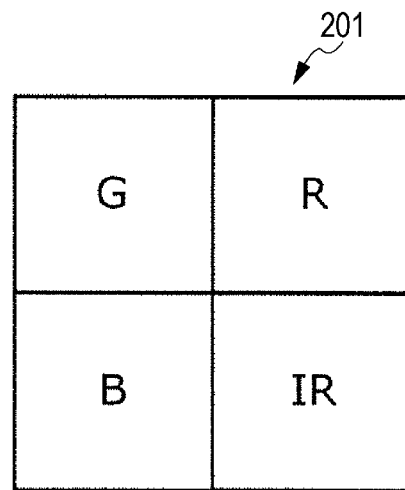
FIG. 7A is a diagram showing a color layout of unit pixels according to the first embodiment.

FIG. 7A shows an example configuration of a Bayer layout one of whose G pixel has been replaced by an IR pixel. An IR pixel is typically realized by forming a visible light cut filter on a pixel. A Bayer layout is a layout of a vertical and horizontal arrangement of the same configurations of single units each including four pixels, namely one R pixel, two G pixels, and one B pixel. Further, the two G pixels are diagonally arranged and are not arranged one above the other or laid on either side of each other.

Figure 7B:
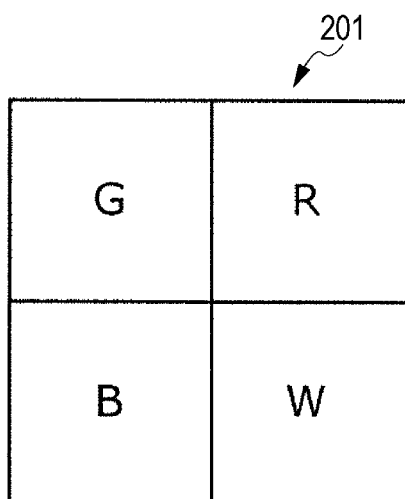
FIG. 7B is a diagram showing a color layout of unit pixels according to the first embodiment.

FIG. 7B shows an example configuration of a Bayer layout one of whose G pixel has been replaced by a W pixel. A W pixel is typically realized by not forming an on-chip color filter on a pixel.

Figure 7C:
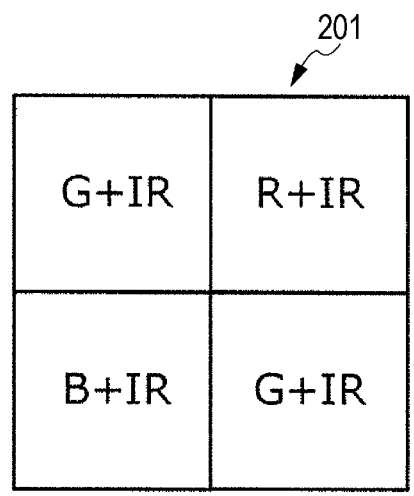
FIG. 7C is a diagram showing a color layout of unit pixels according to the first embodiment.

FIG. 7C shows an example configuration of a Bayer layout all of whose pixels have sensitivity to a band of wavelengths of infrared light. Typically, an on-chip color filter on each of the pixels is configured to transmit light of a band of wavelengths of visible light (red light, green light, or blue light) and light of a band of wavelengths of infrared light. Furthermore, an infrared light cut filter is mounted, and on a front surface of the imager 111, a state where the infrared light cut filter is disposed on an optical path to the imager 111 and a state where the infrared light cut filter is not disposed on the optical path are switched between. Such control makes it possible to switch for each pixel between the acquisition of a signal through visible light (red light, green light, or blue light) and the acquisition of a signal through visible light (red light, green light, or blue light) and infrared light.

Figure 7D:
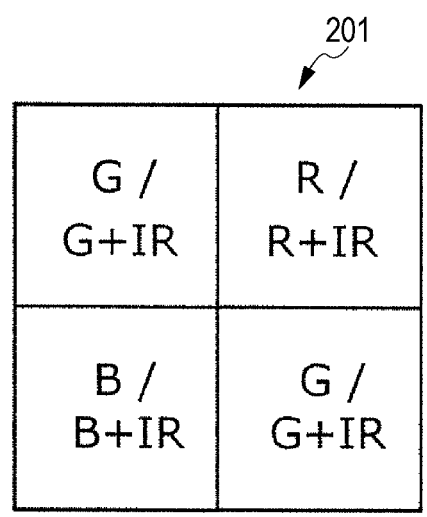
FIG. 7D is a diagram showing a color layout of unit pixels according to the first embodiment.

FIG. 7D shows an example configuration in each of the pixels of a Bayer layout that switches between a state of having sensitivity to a band of wavelengths of infrared light and a state of not having sensitivity to a band of wavelengths of infrared light. Typically, switching between the states can be done by controlling the application of voltage to the pixel.

For example, in the pixel shown in FIG. 6, a band of wavelengths of light that are acquired by each pixel can be changed by switching a potential difference between the transparent electrode 221 and the pixel electrode 223. For example, the photoelectric conversion layer 222 may be composed of two types of material having different absorption spectra. Further, in a case where the potential difference between the transparent electrode 221 and the pixel electrode 223 is larger than a predetermined value, the pixel 201 may be configured to have sensitivity to infrared light, and in a case where the potential difference between the transparent electrode 221 and the pixel electrode 223 is smaller than the predetermined value, the pixel 201 may be configured not to have sensitivity to infrared light. Alternatively, in a pixel including a photodiode, a charge capture region may be changed, for example, by changing a bias voltage applied to a carrier emission region located below the photodiode. This makes it possible to change the band of wavelengths of light that are acquired by each pixel. Further, for example, the application of a high bias voltage to the carrier emission region allows the pixel 201 to have sensitivity only to visible light, and the application of a low bias voltage to the carrier emission region allows the pixel 201 to have sensitivity to visible light and infrared light.

Specifically, in the case of a photoelectric converter having the configuration shown in FIG. 6, it is possible to change the sensitivity of the pixel 201 per unit time by changing the potential difference between the transparent electrode 221 and the pixel electrode 223. For example, detection of charge generated by photoelectric conversion in the photoelectric conversion layer 222 can be prevented by making the potential difference between the transparent electrode 221 and the pixel electrode 223 smaller. That is, the sensitivity of the pixel 201 can be made substantially zero. For example, a global shutter operation is enabled by providing commonality of the transparent electrode 221 among all pixels and simultaneously making the sensitivity of all pixels zero. In a case where the photodiode 211 is used as a photoelectric converter, a global shutter operation is enabled by configuring it to be provided with a charge transfer transistor and a charge storage capacitor. By including a global shutter function, the imager 111 can take an image of a code without distortion even while the vehicle is moving at high speed. This makes it possible to improve the accuracy with which the imaging device 101 recognizes a code. A code will be described in detail later.

Continued reference is made to FIG. 3. The ISP 112 performs image processing as needed on data that is outputted from the imager 111. An example of the data that is outputted from the imager 111 is RAW data. An example of the image processing is a compression process or a correction process. The imager 111 and the ISP 112 may be provided on one and the same chip. This makes it possible to achieve an increase in speed of processing and reductions in cost of the apparatus. The ISP 112 outputs the data outputted from the imager 111 to the image transmitter 113 and the information acquirer 114 as it is or after performing image processing on it. An example of the data that is outputted from the ISP 112 may be RAW data that has not been subjected to image processing, or may be data of a predetermined format obtained by performing image processing on RAW data.

Figure 8A:
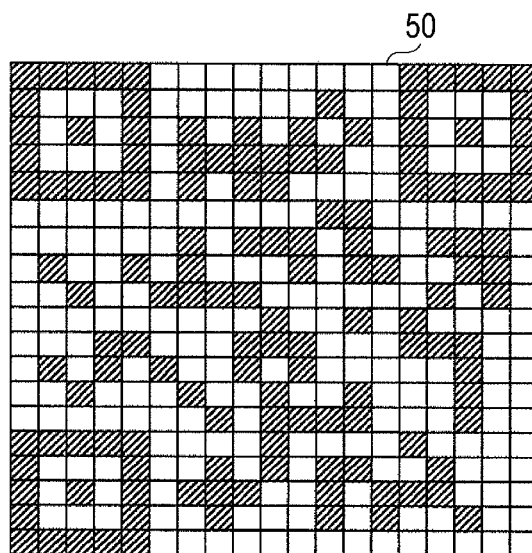
FIG. 8A is a diagram showing an example of a code according to the first embodiment.
Figure 8B:
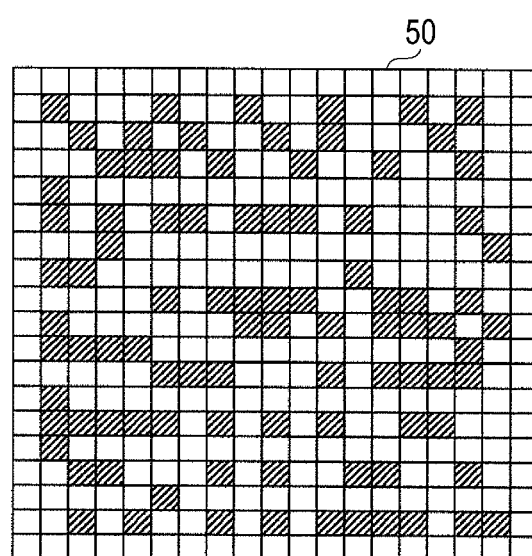
FIG. 8B is a diagram showing an example of a code according to the first embodiment.
Figure 8C:
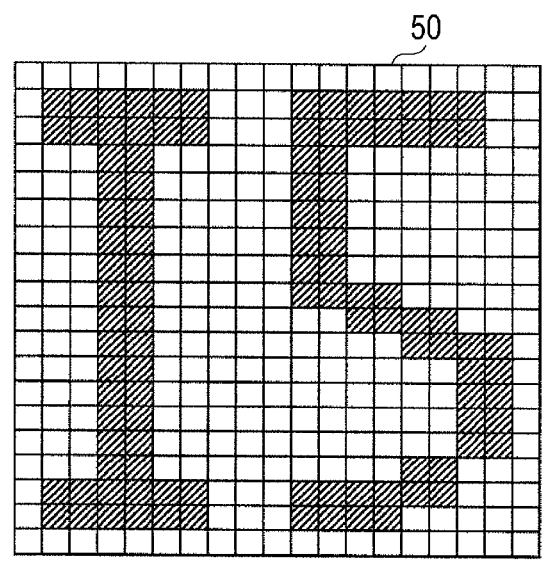
FIG. 8C is a diagram showing an example of a code according to the first embodiment.
Figure 8D:
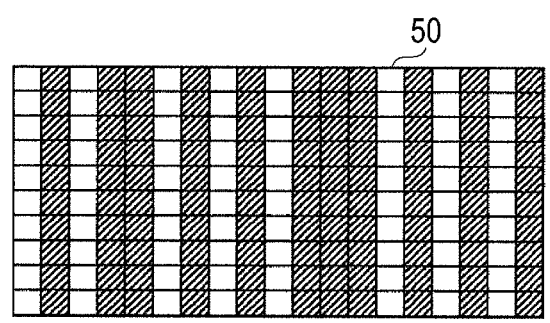
FIG. 8D is a diagram showing an example of a code according to the first embodiment.

The image transmitter 113 outputs the data outputted from the ISP 112 to an external device such as the ECU 105. The information acquirer 114 extracts a code 50 from a shot image. The code 50 is a code into which information has been converted according to a certain rule. Further, the information acquirer 114 decodes the code 50 thus extracted and thereby converts the code 50 into information such as traffic information. FIGS. 8A to 8D are diagrams showing examples of the code 50. For example, as shown in FIGS. 8A to 8C, the code 50 is a two-dimensional pattern. Specifically, the code 50 may be a QR code (registered trademark) such as that shown in FIG. 8A, a given pattern such as that shown in FIG. 8B, or a character or symbol such as that shown in FIG. 8C. Alternatively, the code 50 may be a bar code, which is a one-dimensional pattern, such as that shown in FIG. 8D.

Further, the information acquirer 114 performs a decoding process an example of which is a decoding process described in JIS X 0510:2004 on a QR code (registered trademark) or the acquisition of corresponding information by pattern matching. Further, in a case where the code 50 is information itself, the information acquirer 114 performs character recognition or the like as a decoding process. The information acquirer 114 may be realized by the ISP 112.

The information thus extracted may for example be sent to the after-mentioned ECU 105 for use in control of the speed and braking of the vehicle. Alternatively, the information thus extracted may be sent to the display 103 for use in presentation of traffic information to the driver, warning of danger by a display or a sound, or the like.

The system controller 115 includes an inputter 122, an outputter 121, a program memory 123, a working memory 125, and a control microcomputer 126. A program 124 is stored in the program memory 123. The microcomputer 126 functions, for example, as a controller of the imaging device 101 by executing the program 124 while using the working memory 125. The system controller 115 may not only control the ISP 112 but also control the imager 111. The outputter 121 outputs a result of control in the system controller 115 to the imager 111.

The display 103 displays a camera image. The network communicator 104 is means for wirelessly connecting to the Internet. For example, the network communicator 104 allows information necessary for an information acquisition process in the information acquirer 114 to be acquired from the Internet via the network communicator 104. The ECU 105 is a unit that exercises various types of body control such as an engine, braking, or acceleration.

It should be noted that these constituent elements do not need to be each independently configured but may be integrated.

Figure 9:
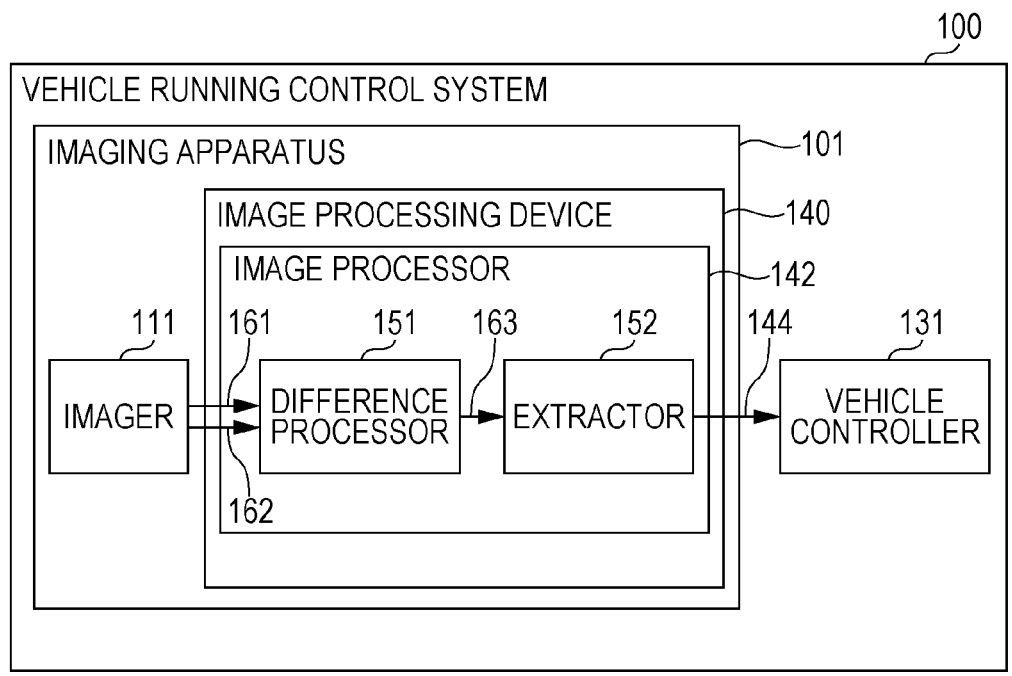
FIG. 9 is a block diagram of the vehicle running control system according to the first embodiment.

FIG. 9 is a block diagram showing a functional configuration of the vehicle running control system 100 according to the first embodiment. For example, the vehicle running control system 100 is mounted on a vehicle. As shown in FIG. 9, the vehicle running control system 100 includes the imaging device 101 and a vehicle controller 131.

The imaging device 101 includes the imager 111 and an image processing device 140. The image processing device 140 is realized, for example, by the ISP 112 and the information acquirer 114, which are shown in FIG. 3. This image processing device 140 includes an image processor 142.

The image processing device 140 may be located outside the imaging device 101. For example, the imaging device 101 may transmit a shot image to the image processing device 140 located outside the imaging device 101. The image processing device 140 may perform a process on a received image.

The imager 111 takes a first image 161 and a second image 162. The first image 161 is an image taken of visible light and contains an image of an object, and the second image 162 is an image taken of non-visible light and contains an image of the object. Alternatively, the second image 162 may be an image taken of visible light and non-visible light. Further, an example of the non-visible light is infrared light. Further, the first and second images 161 and 162 taken by the imager 111 are each stored in a frame memory. The frame memory may be embedded in the imager 111 or the ISP 112, or may be a discrete memory element.

An example of the object is a display medium that displays a code 50. The code 50 is associated, for example, with information. Another example of the object may be a sign, a signboard, an electric bulletin board, or a building. The code 50 is displayed through non-visible light. This allows the object to display the information without impairing the visibility or design of appearance as observed through visible light. Specifically, the object may display the code 50 by emitting non-visible light. For example, the object may be a light source that emits non-visible light. Alternatively, the object may display the code 50 by reflecting non-visible light. For example, a part of the object that displays the code 50 may be higher in reflectance with respect to non-visible light than with respect to visible light. The code 50 herein refers, for example, to a pattern composed of a part that emits or reflects more non-visible light and the other part and associated with particular information.

Figure 2:
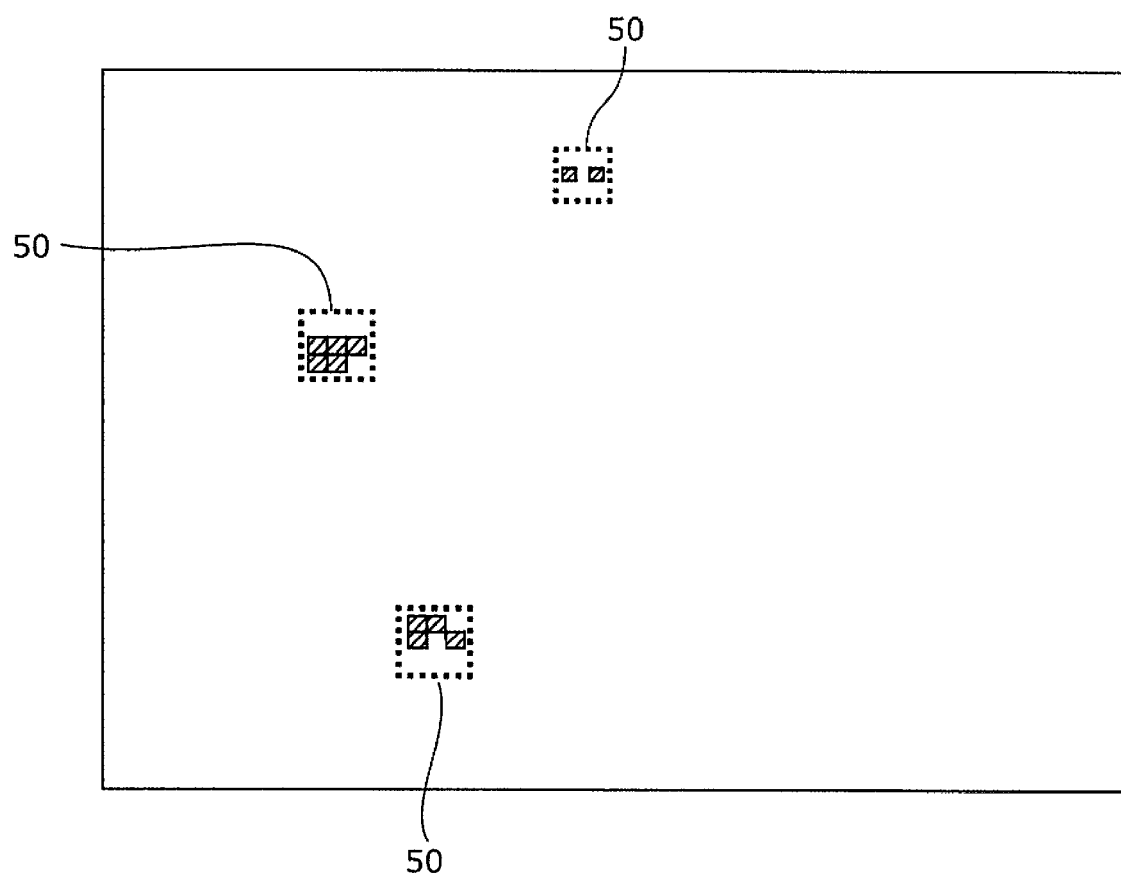
FIG. 2 is a diagram showing an example of a third image according to the first embodiment.

FIG. 1 shows a display medium 51, which is a road sign, a display medium 52, which is a signboard, and a display medium 53, which is a vehicle. FIG. 1 shows an example of an image of the display media 51, 52, and 53 taken by a camera that can take an image of a non-visible light. FIG. 1 shows background parts other than the codes 50. This is because, in the open air during the daytime, non-visible light contained in sunlight causes general objects such as humans, vehicles, and buildings to emit non-visible light. That is, even if an image is taken by an imaging device that has sensitivity to an infrared region, there is a case, as shown in FIG. 1, where it is difficult to extract the codes 50 with high contrast. In Embodiment 1, the codes 50 are extracted with high accuracy as shown in FIG. 2 through the after-mentioned image processing.

For example, the imager 111 may include a plurality of first pixels that have sensitivity to visible light and a plurality of second pixels that have sensitivity to non-visible light. The first image 161 is obtained through the plurality of first pixels. The second image 162 is obtained through the plurality of second pixels. Examples of the first pixels include the R, G, and B pixels shown in FIG. 7A or 7B. Examples of the second pixels include the IR pixel shown in FIG. 7A or the W pixel shown in FIG. 7B.

Alternatively, the imager 111 may include a plurality of pixels 201 having a first imaging state in which each of the pixels 201 has sensitivity to visible light and a second imaging state in which the plurality of pixels 201 have sensitivity to non-visible light. With this, the first image 161 is obtained in the first imaging state. The second image 162 is obtained in the second imaging state. That is, the first image 161 and the second image 162 are obtained through the same pixels 201. For example, as in the case of the configuration shown in FIG. 7C or 7D, the same pixels 201 may switch between a state in which they have sensitivity to a band of wavelengths of visible light and a state in which they have sensitivity to a band of wavelengths of non-visible light. This makes it possible to obtain the first image 161 and the second image 162 through the same pixels 201.

The image processor 142 acquires the first image 161 and the second image 162 from the imager 111. The image processor 142 includes a difference processor 151 and an extractor 152.

The difference processor 151 performs a difference process between the first image 161 and the second image 162 and thereby generates a third image 163 containing an image of the object. This difference process generates the third image 163, which is larger than the second image 162 in terms of the ratio between a signal intensity of an image of the light-emitting part of the code 50 and a signal intensity of an image other than the code 50. This makes it easier to extract an image of the code 50 from the third image 163. That is, assume that, in the second image 162, the highest one of signal intensities of the image of the code 50 is a first intensity, and the highest one of signal intensities of the image other than the code 50 is a second intensity. Further, assume that, in the third image 163, the highest one of signal intensities of the image of the code 50 is a third intensity, and the highest one of signal intensities of the image other than the code 50 is a fourth intensity. In this case, the ratio of the third intensity to the fourth intensity is higher than the ratio of the first intensity to the second intensity.

The extractor 152 extracts the code 50 from the third image 163. Further, the extractor 152 acquires information 144 associated with the code 50 thus extracted. An example of the information 144 is traffic information. An example of the traffic information is information that indicates the content of a road sign. A specific example of the traffic information is information that indicates "DO NOT APPROACH" or "DO NOT ENTER".

The vehicle controller 131 controls the braking and acceleration of the vehicle on the basis of the information 144. For example, the vehicle controller 131 is realized by the ECU 105 shown in FIG. 3.

It should be noted that the present disclosure not only can be realized as the vehicle running control system 100 but also may be realized as the imaging device 101 or the image processing device 140.

Second Embodiment

Figure 10:
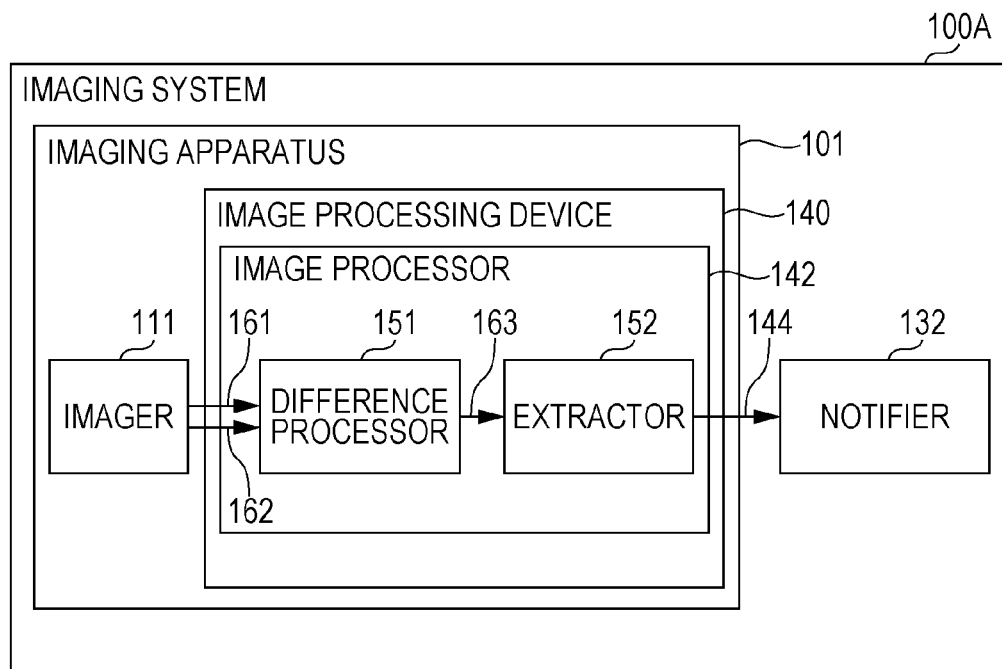
FIG. 10 is a block diagram of an imaging system according to a second embodiment.

In a second embodiment, the information 144 is notified to a user. An example of the user is a driver of the vehicle. FIG. 10 is a block diagram of an imaging system 100A according to the second embodiment. The imaging system 100A differs from the vehicle running control system 100 according to the first embodiment in that it includes a notifier 132 instead of the vehicle controller 131.

The notifier 132 notifies the user of the information 144. For example, the notifier 132 displays the information 144. Alternatively, the notifier 132 may notify the user of the information 144 by a sound or the like. For example, the notifier 132 is realized by the display 103 shown in FIG. 3. The information 144 per se may be notified to the user, or a warning or the like based on the information 144 may be notified to the user. The vehicle running control system 100 may further include the notifier 132.

In the following, the operation of the vehicle running control system 100 thus configured is described.

In the following, an information acquisition process that is performed by the imager 111 is described with reference to a flow chart shown in FIG. 11. In the second embodiment, the imager 111 includes the pixel configuration shown in FIG. 7A or 7B. That is, the imager 111 can simultaneously acquire a first image 161 and a second image 162.

The imager 111 starts imaging. The imaging may be started by manual control exercised by an occupant of the vehicle. Alternatively, the imaging may be automatically started in correspondence with an operation serving as a starting point. An example of the operation is engine starting of the vehicle.

Next, the imager 111 takes a first image 161 and a second image 162 (S101).

Next, the image processor 142 acquires the first and second images 161 and 162 taken by the imager 111. The difference processor 151 generates a third image 163 through a difference process between the first image 161 and the second image 162 (S102). For example, the difference processor 151 calculates a difference between a total of output values of the R, G, and B pixels and an output value of the IR or W pixel. Alternatively, the difference processor 151 may calculate a difference between an output value of a predetermined one of the R, G, and B pixels and an output value of the IR or W pixel. Further, the difference processor 151 performs a difference process on corresponding pixels of the first and second images 161 and 162.

Next, the extractor 152 generates a binary image by performing a binary process on the third image 163 thus obtained at a predetermined threshold (S103). The threshold is set in advance on the basis of a characteristic of the imager 111 or an experimental result.

Next, the extractor 152 extracts a code 50 from the binary image with use of a known technique such as pattern matching (S104). Specifically, the extractor 152 extracts all codes 50 in the image and stores the codes 50 thus extracted and types of the codes 50 in a memory. The "types of the codes 50" here are bar codes, QR codes (registered trademark), or the like.

Finally, the extractor 152 acquires information 144 corresponding to the code 50 thus extracted (S105). For example, the extractor 152 holds a table that indicates the information 144 corresponding to the code 50. The extractor 152 refers to this table to acquire the information 144 corresponding to the code 50. The extractor 152 may acquire the information 144 corresponding to the code 50 by matching with data on a network. Alternatively, the process of acquiring information 144 per se may be performed on a cloud.

In the extraction of a code 50 (S104), a plurality of codes 50 may be extracted. In a case where a plurality of codes 50 have been extracted, the extractor 152 acquires information 144 for each of the plurality of codes 50. In this case, at a point in time where a first code 50 has been extracted, the extractor 152 may perform the process of acquiring information 144 corresponding to that code 50. Therefore, the extractor 152 may execute steps S104 and S105 in parallel.

Figure 12:
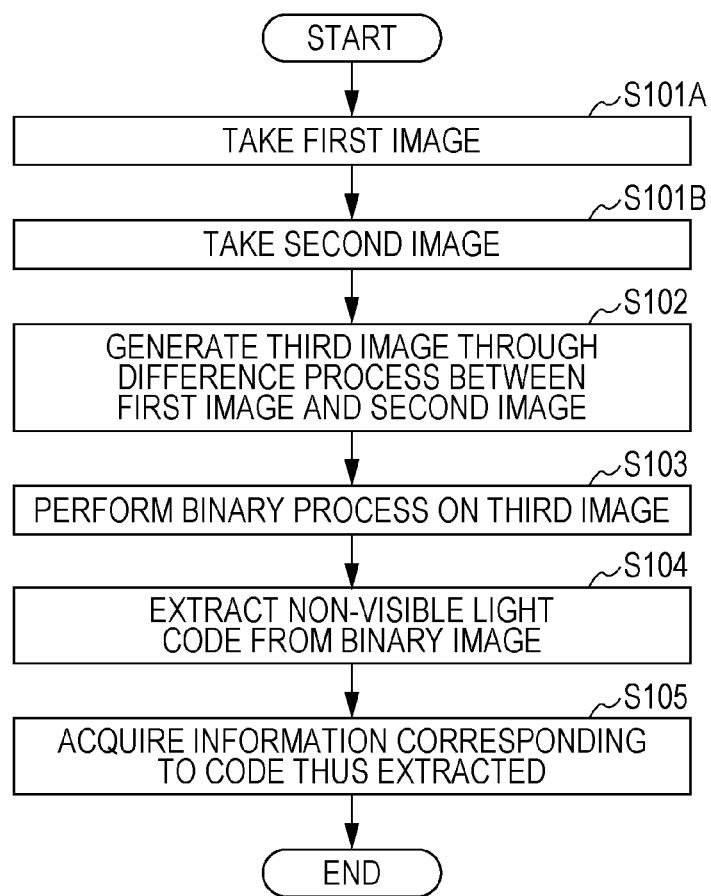
FIG. 12 is a flow chart of an information acquisition process according to the second embodiment in which a first image and a second image are sequentially acquired.

FIG. 12 shows a flow chart of an information acquisition process that is performed in a case where the imager 111 has a different configuration. In this case, the imager 111 has the configuration shown in FIG. 7C or 7D. That is, the imager 111 acquires a first image 161 and a second image 162 in this order. The flow chart shown in FIG. 12 differs from the flow chart shown in FIG. 9 in that step S101 has been replaced by steps S101A and S101B.

The imager 111 takes a first image 161 (S101A). After that, the imager 111 switches its imaging state and takes a second image 162 (S101B). For example, in the configuration shown in FIG. 7C, the infrared light cut filter is placed on the optical path to the imager 111 in step S101A. Meanwhile, the infrared light cut filter is removed from the optical path to the imager 111 in step S101B. This makes switching between the imaging states. Further, in the configuration shown in FIG. 7D, switching between the imaging states is done by controlling the application of voltage to the pixel 201. Specifically, switching between the imaging states is done by changing the potential difference between the transparent electrode 221 and the pixel electrode 223.

Figure 11:
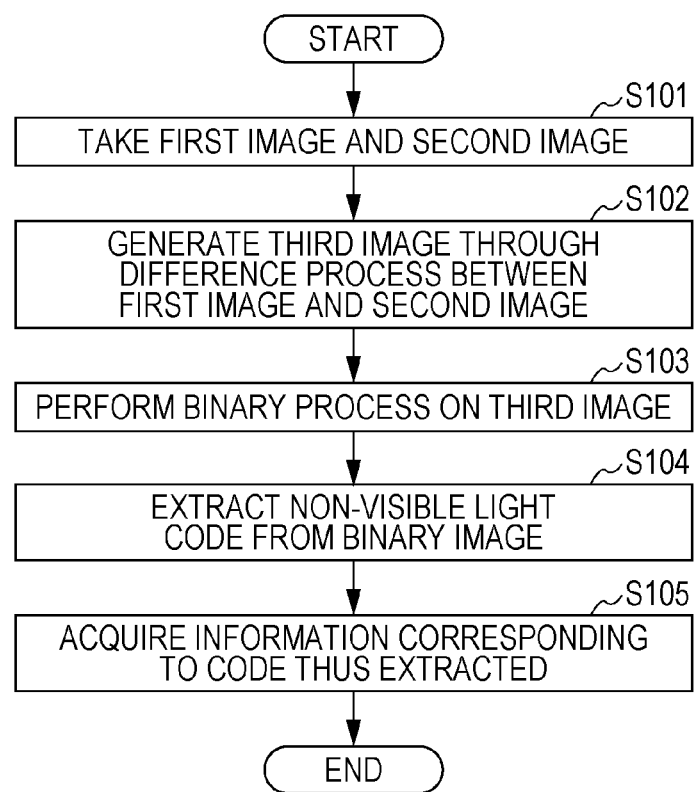
FIG. 11 is a flow chart of an information acquisition process according to the second embodiment in which a first image and a second image are simultaneously acquired.

It should be noted that the subsequent steps are not described, as they are the same as those of FIG. 11. It should also be noted that, in the present example, the order in which the first image 161 and the second image 162 are taken may be reversed.

By performing a difference process such as that shown in the second embodiment, a part of an output value of the second image 162 attributed to non-visible light contained in sunlight can be reduced with use of the first image 161. This can make the code 50 higher in contrast than a part other than the code 50, thus making it possible to extract the code 50 at high speed and with high accuracy.

The information acquisition process shown in FIG. 11 or 12 may be always performed while the engine of the vehicle is working. Alternatively, the information acquisition process may be performed at regular intervals. Further, this information acquisition process may be performed with external information as a starting point. For example, the vehicle may detect entry of the vehicle into a particular area such as a school zone, and the information acquisition process may be started with the detection as a starting point. Further, this information acquisition process may be started with a change in control information inside the vehicle as a starting point. An example of the change is a change in gear.

In the foregoing description, a third image 163 is generated through a difference process between a first image 161 and a second image 162. However, there may be rare cases where circumstances make it difficult to accurately detect a code 50 through a mere difference process alone. An example of such cases is a case where a signal intensity of an image of the light-emitting part of the code 50 in the second image 162 is lower than a signal intensity of an image of the light-emitting part of the code 50 in the first image 161. In such a case, subtracting the first image 161 from the second image 162 may cause the absolute value of a difference between the images of the light-emitting part of the code 50 to be smaller than the absolute value of a difference between the images other than the code 50. That is, a reversal of the image of the code 50 may take place in the third image 163.

Note here that the signal intensity of the image of the light-emitting part of the code 50 in the second image 162 is a result of addition of a signal intensity attributed to non-visible light that is emitted by the light-emitting part of the code 50 to a signal intensity of an image of the light-emitting part of the code 50 based on the assumption that the code 50 does not emit non-visible light. Further, the signal intensity of the image of the light-emitting part of the code 50 based on the assumption that the code 50 does not emit non-visible light is considered to be equal to the signal intensity of the image other than the code 50. Therefore, by making a correction so that a signal intensity of the image other than the code 50 in the second image 162 becomes substantially equal to or higher than a signal intensity of the image other than the code 50 in the first image 161, the signal intensity of the image of the light-emitting part of the code 50 in the second image 162 can be made higher than the signal intensity of the image of the light-emitting part of the code 50 in the first image 161. That is, a reversal of the image of the code 50 in the third image 163 can be suppressed.

Such a correction may be made, for example, by setting a given region other than the code 50 in the first image 161 and the second image 162 and calculating a correction factor so that a minimum value of signal intensity of the second image 162 in that region becomes larger than a minimum value of signal intensity of the first image 161 in the same region. Alternatively, on the basis of spectral sensitivity characteristics of first pixels through which the first image 161 is acquired and spectral sensitivity characteristics of second pixels through which the second image 162 is acquired, a correction factor may be calculated so that the signal intensity of the image other than the code 50 in the second image 162 becomes substantially equal to or higher than the signal intensity of the image other than the code 50 in the first image 161. Further, in calculating the correction factor, the spectrum of sunlight may be taken into account. A specific embodiment is described next.

Third Embodiment

In a third embodiment, an image processing device 140A corrects at least either a first image 161 or a second image 162 so that output values of corresponding pixels of the first and second images 161 and 162 become the same for light of the same intensity. More specifically, the image processing device 140A makes a correction on the basis of differences in quantum efficiency and spectral sensitivity characteristic between pixels 201 used for taking the first image 161 and the second image 162. This makes it possible to make a correction so that a signal intensity of an image of a light-emitting part of a code 50 in the second image 162 becomes higher than a signal intensity of an image of the light-emitting part of the code 50 in the first image 161.

Figure 13:
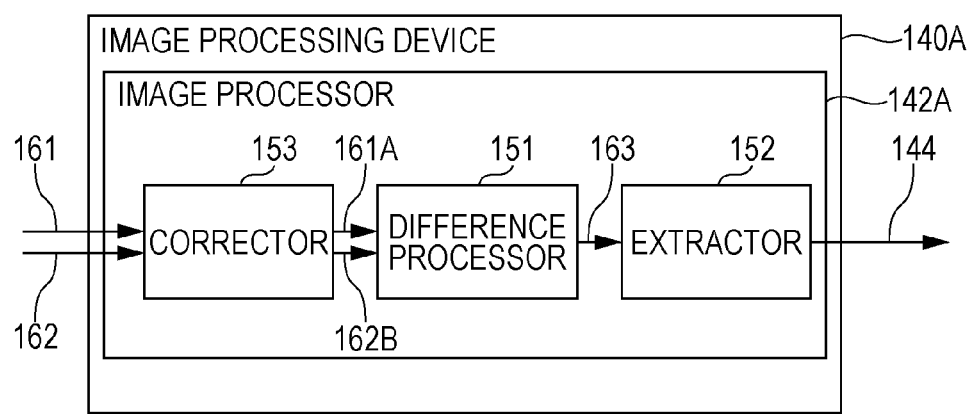
FIG. 13 is a block diagram of an image processing device according to a third embodiment.

FIG. 13 is a block diagram of the image processing device 140A according to the third embodiment. The image processing device 140A differs from the image processing device 140 in that an image processor 142A includes a corrector 153.

Figure 14:
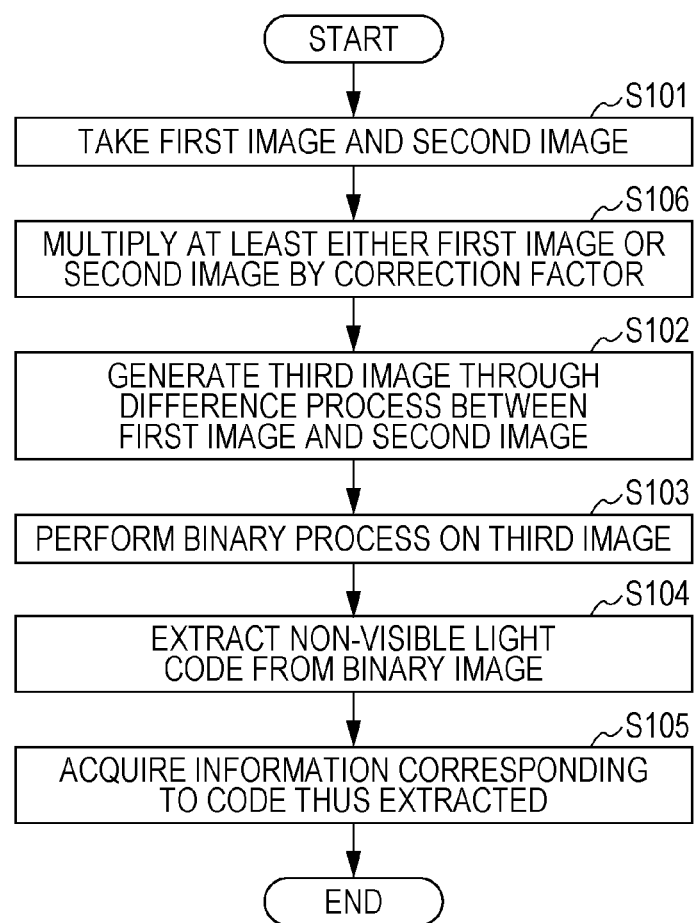
FIG. 14 is a flow chart of an information acquisition process according to the third embodiment in which a first image and a second image are simultaneously acquired.

In the following, an information acquisition process that involves the use of the image processing device 140A is described with reference to a flow chart shown in FIG. 14. The imager 111 has the pixel configuration shown in FIG. 7A or 7B. That is, the imager 111 simultaneously acquires a first image 161 and a second image 162. The process shown in FIG. 14 differs from the process shown in FIG. 11 in that step S106 has been added.

In step S106, the corrector 153 multiplies the first image 161 and the second image 162 by correction factors so that a difference between the output values of the corresponding pixels of the first and second images 161 and 162 become smaller in a region other than the code 50. That is, the corrector 153 generates a corrected first image 161A by multiplying the first image 161 by a first correction factor. Further, the corrector 153 generates a corrected second image 162A by multiplying the second image 162 by a second correction factor. Alternatively, the corrector 153 may multiply only either the first image 161 or the second image 162 by a correction factor.

Next, the difference processor 151 generates a third image 163 through a difference process between the corrected first image 161A and the corrected second image 162A (S102). It should be noted that the subsequent steps are not described, as they are the same as those of FIG. 11.

The first correction factor and the second correction factor or the correction factor is calculated on the basis of a first spectral sensitivity characteristic of the pixels 201 used for taking the first image 161 and a second spectral sensitivity characteristic of the pixels 201 used for taking the second image 162.

Figure 15A:
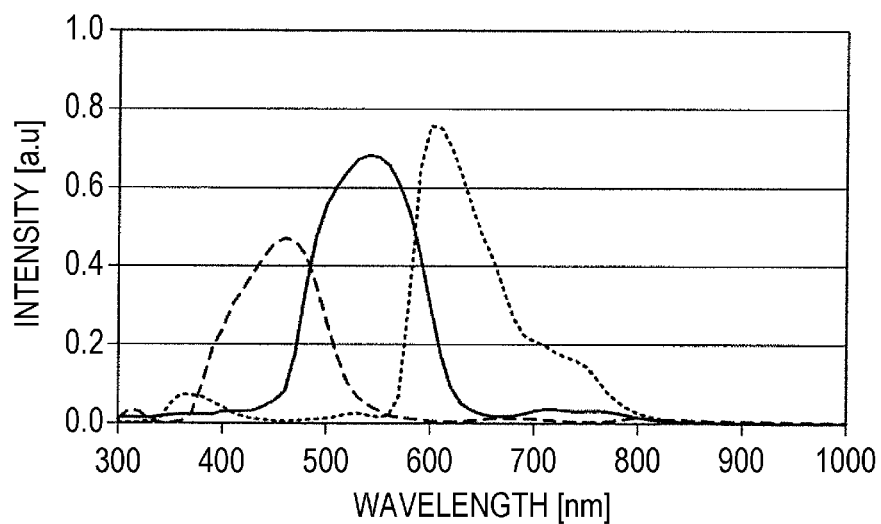
FIG. 15A is a diagram showing examples of spectral sensitivity characteristics of an R pixel, a G pixel, and a B pixel according to the third embodiment.
Figure 15B:
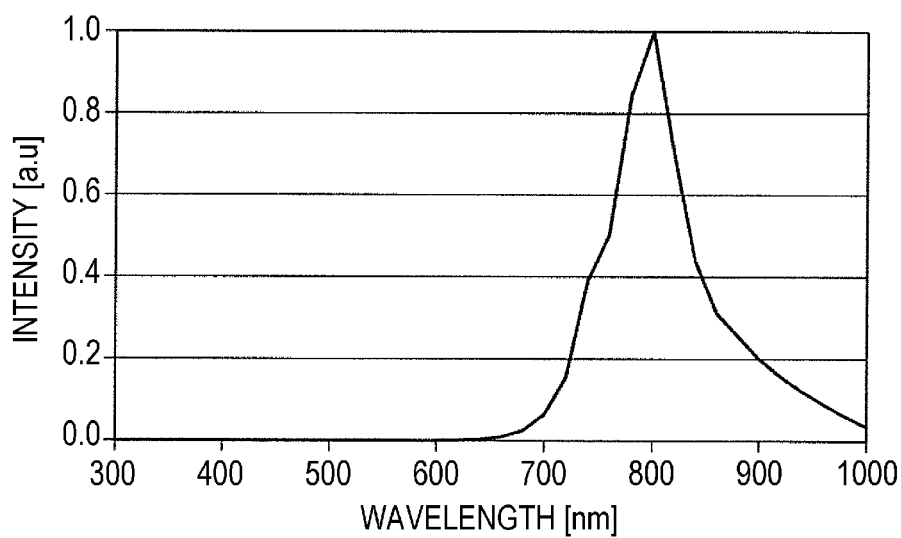
FIG. 15B is a diagram showing an example of a spectral sensitivity characteristic of an IR pixel according to the third embodiment.

FIG. 15A is a diagram showing examples of spectral sensitivity characteristics of the R, G, and B pixels. FIG. 15B is a diagram showing an example of a spectral sensitivity characteristic of the IR pixel. For example, the correction factor is set in advance so that a total of integrated values of graphs of the spectral sensitivity characteristics of the R, G, and B pixels and an integrated value of a graph of the spectral sensitivity characteristic of the IR pixel become equal. In the present example, the integrated values of the graphs of the R, G, B, and IR pixels are 4.1, 4.3, 2.6, and 5.4, respectively. Accordingly, in a case where only the first image 161 is multiplied by the correction factor, using 5.4/(4.1+4.3+2.6)=0.49 as the correction factor makes it possible to make a correction so that the total of the respective output values of the R, G, and B pixels and the output value of the IR pixel become equal.

Further, in a case where only the second image 162 is multiplied by the correction factor, the correction factor is the reciprocal of the numerical value of the present example. That is, 1/0.49=2.04 is used as the correction factor. Further, in a case where both the first image 161 and the second image 162 are corrected, the settings are configured so that the ratio between the first correction factor, by which the first image 161 is multiplied, and the second correction factor, by which the second image 162 is multiplied, becomes equal to the ratio between the output value of the second image 162 and the output value of the first image 161.

It should be noted that the same applies to a case where the IR pixel is replaced by a W pixel as shown in FIG. 7B. It should also be noted that the spectral sensitivity characteristic of each pixel may be set in advance and the correction factor may be set in advance at the time of system development.

Figure 16:
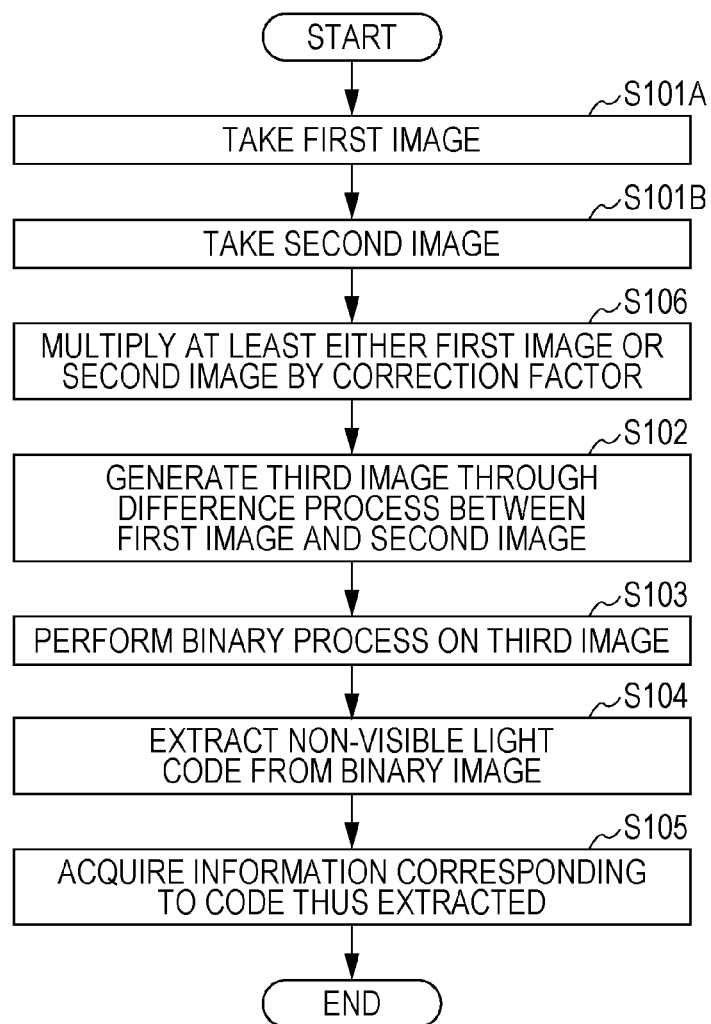
FIG. 16 is a flow chart of an information acquisition process according to the third embodiment in which a first image and a second image are sequentially acquired.

FIG. 16 shows a flow chart of an information acquisition process that is performed in a case where the imager 111 has a different configuration. In this case, the imager 111 has the pixel configuration shown in FIG. 7C or 7D. That is, the imager 111 acquires a first image 161 and a second image 162 in this order. The flow chart shown in FIG. 16 differs from the flow chart shown in FIG. 14 in that step S101 has been replaced by steps S101A and S101B.

Figure 17A:
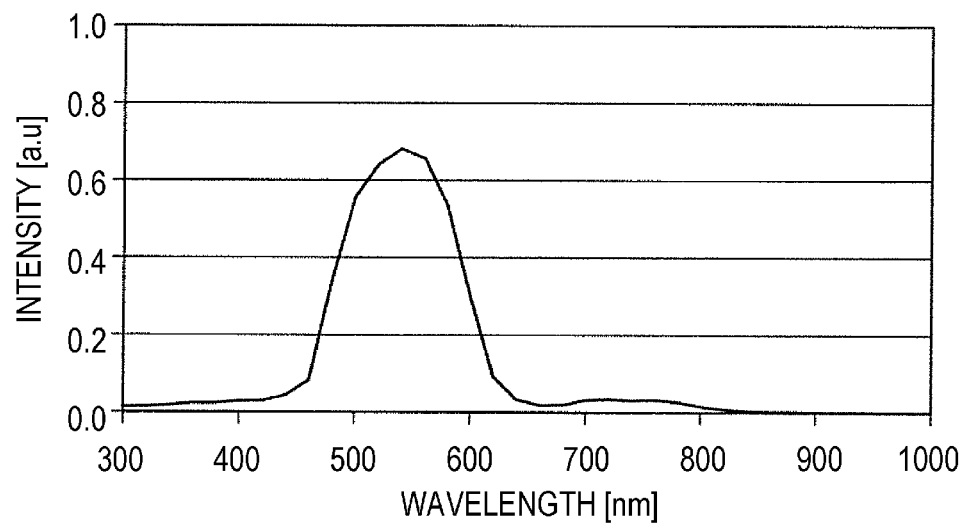
FIG. 17A is a diagram showing an example of a spectral sensitivity characteristic of a G pixel according to the third embodiment.
Figure 17B:
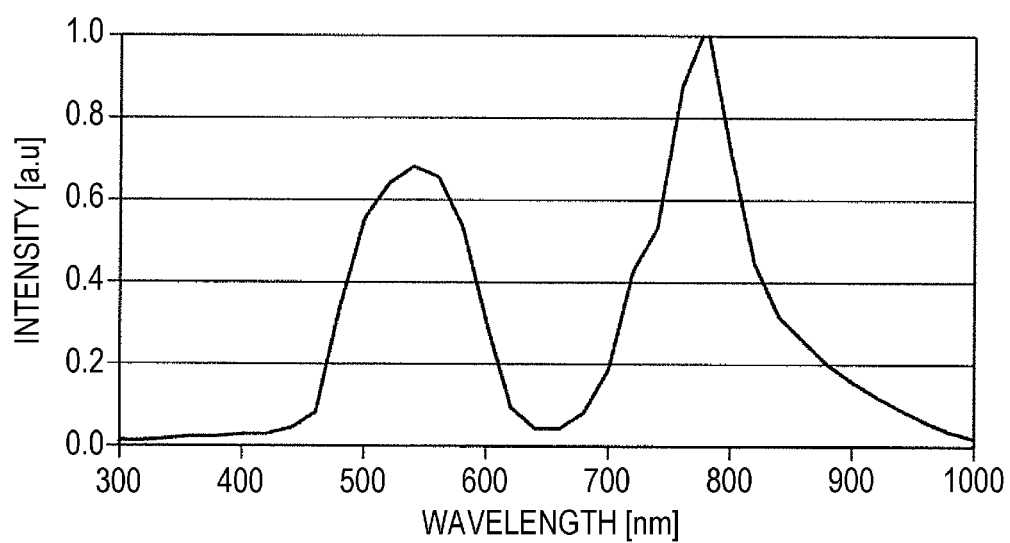
FIG. 17B is a diagram showing an example of a spectral sensitivity characteristic of a G+IR pixel according to the third embodiment.

A spectral sensitivity characteristic of a G+IR pixel is described with reference to FIGS. 17A and 17B. A G+IR pixel may have sensitivity to a band of wavelengths of green light and a band of wavelengths of infrared light. FIG. 17A is a diagram showing an example of a spectral sensitivity characteristic of a G+IR pixel set to have sensitivity to a band of wavelengths of green light. In the following, FIG. 17A is called "G state graph". FIG. 17B is a diagram showing an example of a spectral sensitivity characteristic of a G+IR pixel set to have sensitivity to a band of wavelengths of green light and a band of wavelengths of infrared light. In the following, FIG. 17B is called "G+IR state graph". For example, the correction factor is set in advance so that an integrated value of the G state graph and an integrated value of the G+IR state graph become equal. In the present example, the integrated value the G state graph is 4.3, and the integrated value of the G+IR state graph is 9.7. Accordingly, in a case where only the first image 161 is multiplied by the correction factor, using 9.7/4.3=2.25 as the correction factor makes it possible to make a correction so that an output value of the G pixel at the time of acquisition of the first image 161 and an output value of the G+IR pixel at the time of acquisition of the second image 162 become equal.

Further, in a case where only the second image 162 is multiplied by the correction factor, the correction factor is the reciprocal of the numerical value of the present example. That is, 1/2.25=0.44 is used as the correction factor. Further, in a case where both the first image 161 and the second image 162 are corrected, the settings are configured so that the ratio between the first correction factor, by which the first image 161 is multiplied, and the second correction factor, by which the second image 162 is multiplied, becomes equal to the ratio between the output value of the second image 162 and the output value of the first image 161.

In this way, the corrector 153 makes a correction so that the corresponding pixels of the first and second images 161 and 162 become equal in sensitivity. This makes it possible to further reduce an output value of a background of the code 50. Therefore, the extractor 152 can extract only the code 50 with high accuracy.

Fourth Embodiment

In a fourth embodiment, a modification of the third embodiment is described. In the fourth embodiment, the spectrum of sunlight is further used for calculating a correction factor. More specifically, a correction factor is used which is obtained by multiplying, by the spectrum of sunlight, the spectral sensitivity characteristics of the pixels 201 used for taking the first image 161 and the spectral sensitivity characteristics of the pixels 201 used for taking the second image 162. This makes it possible to make a correction with higher accuracy so that a signal intensity of an image of a light-emitting part of a code 50 in the second image 162 becomes higher than a signal intensity of an image of the light-emitting part of the code 50 in the first image 161.

Figure 18:
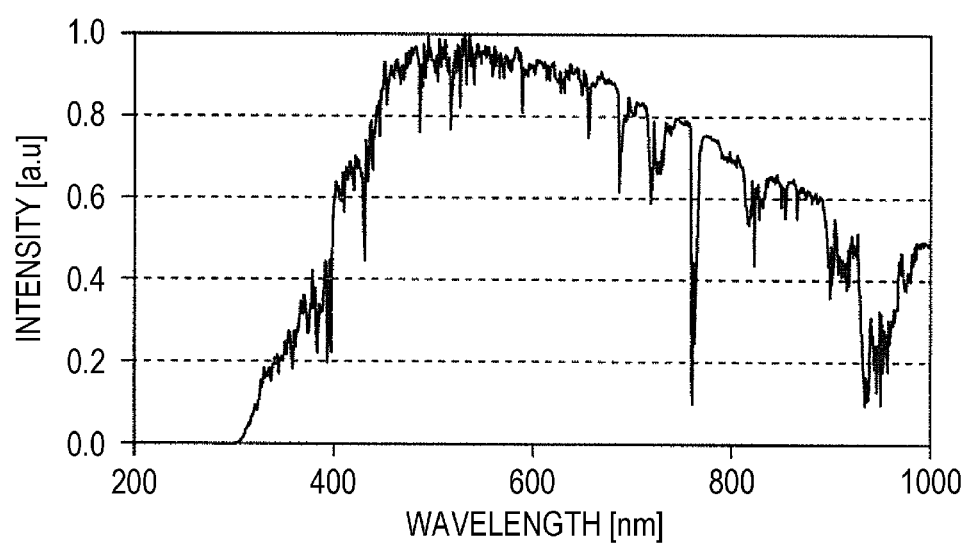
FIG. 18 is a diagram showing an example of a spectrum of sunlight according to a fourth embodiment.

FIG. 18 is a diagram showing the spectrum of sunlight. As shown in FIG. 18, sunlight has a spectrum that takes on a maximum value near 500 nm and gently decreases in intensity toward a longer wavelength. This makes it possible to eliminate the effect of sunlight with higher accuracy by introducing a correction factor calculated with the effect of this spectrum of sunlight taken into account. An output value of the imager 111 at the time of incidence of sunlight is obtained by multiplication of the spectrum of sunlight and the spectral sensitivity characteristic of the imager 111 at each wavelength. That is, in the fourth embodiment, the correction factor or the first correction factor and the second correction factor are calculated on the basis of a first characteristic obtained by multiplying, by the spectrum of sunlight, the first spectral sensitivity characteristic of the pixels 201 through which the first image 161 has been obtained and a second characteristic obtained by multiplying, by the spectrum of sunlight, the second spectral sensitivity characteristic of the pixels 201 through which the second image 162 has been obtained.

Figure 19A:
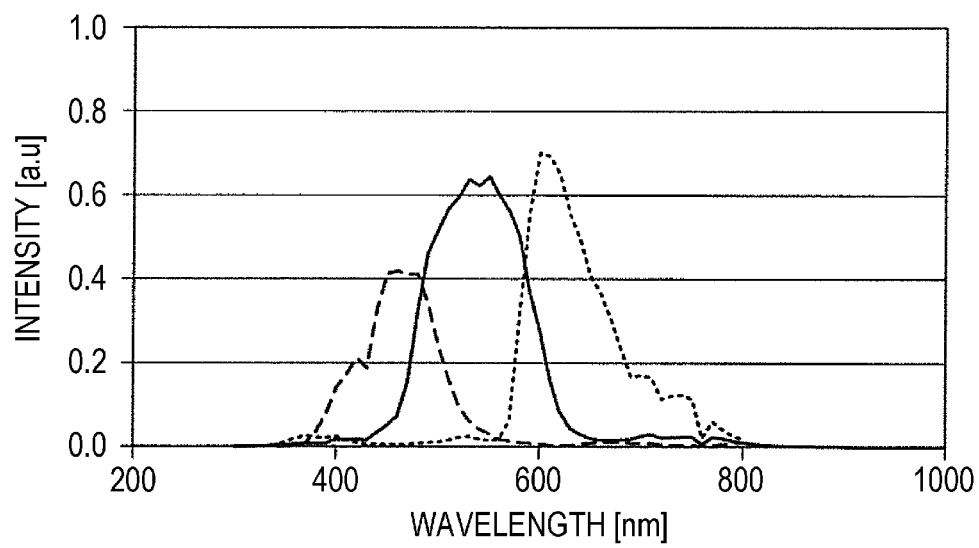
FIG. 19A is a diagram showing results of multiplication of spectral sensitivity characteristics of an R pixel, a G pixel, and a B pixel and the spectrum of sunlight according to the fourth embodiment.
Figure 19B:
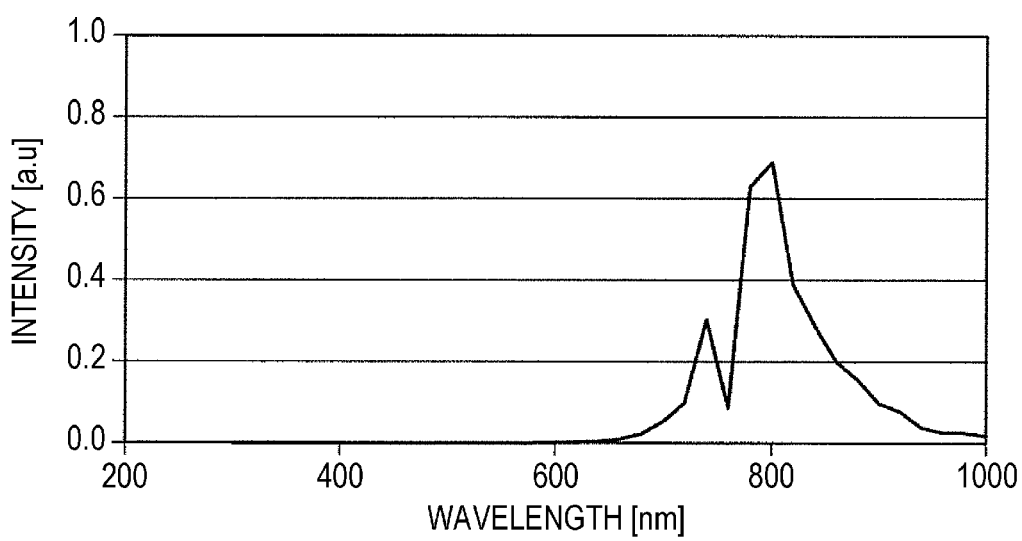
FIG. 19B is a diagram showing a result of multiplication of a spectral sensitivity characteristic of an IR pixel and the spectrum of sunlight according to the fourth embodiment.

FIG. 19A is a diagram showing a result of multiplication of the spectrum of sunlight shown in FIG. 18 and each of the spectral sensitivity characteristics of the R, G, and B pixels shown in FIG. 15A. FIG. 19B is a diagram showing a result of multiplication of the spectrum of sunlight shown in FIG. 18 and the spectral sensitivity characteristic of the IR pixel shown in FIG. 15B. As in the case of the third embodiment, for example, a correction factor is set so that a total of integrated values of the graphs shown in FIG. 19A and an integrated value of the graph shown in FIG. 19B become equal. In the present embodiment, the integrated values of the graphs corresponding to the R, G, and B pixels shown in FIG. 19A are 3.4, 3.9, and 2.0, respectively. Further, the integrated value of the graph corresponding to the IR pixel shown in FIG. 19B is 3.2. Accordingly, in a case where only the first image 161 is corrected, using 3.2/(3.4+3.9+2.0) =0.34 as the correction factor makes it possible to make the total of the outputs of the R, G, and B pixels and the output of the IR pixel equal. It should be noted that the same can apply to a case where the IR pixel is replaced by a W pixel as shown in FIG. 7B.

Further, in a case where only the second image 162 is corrected, the correction factor is the reciprocal of the numerical value of the present example. Further, in a case where both the first image 161 and the second image 162 are corrected, the settings are configured so that the ratio between the first correction factor, by which the first image 161 is multiplied, and the second correction factor, by which the second image 162 is multiplied, becomes equal to the ratio between the output of the second image 162 and the output of the first image 161.

In this way, the corrector 153 makes a correction in consideration of the spectrum of sunlight so that the corresponding pixels of the first and second images 161 and 162 become equal in output value. This makes it possible to further reduce an output value of a background part of the code 50. Therefore, the extractor 152 can extract only the code 50 with high accuracy.

Fifth Embodiment

Figure 20:
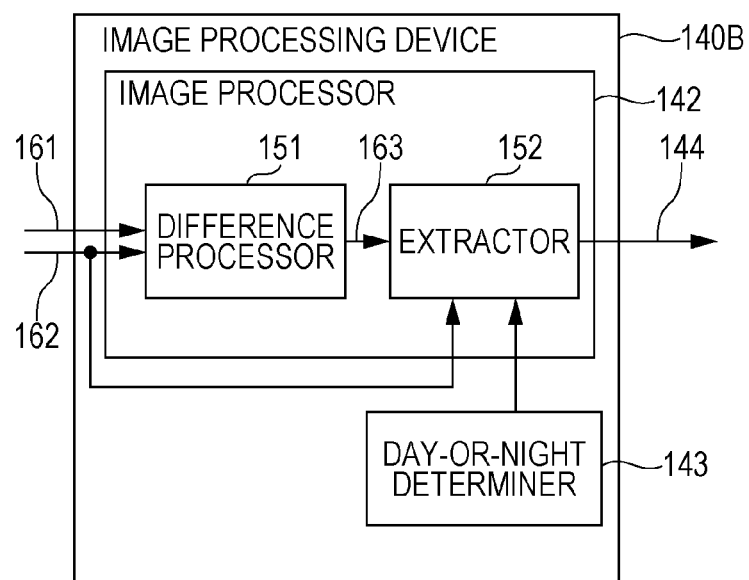
FIG. 20 is a block diagram of an image processing device according to a fifth embodiment.

FIG. 20 is a block diagram of the image processing device 140B according to a fifth embodiment. The image processing device 140B shown in FIG. 20 differs from the image processing device 140 in that it includes a day-or-night determiner 143.

Figure 21:
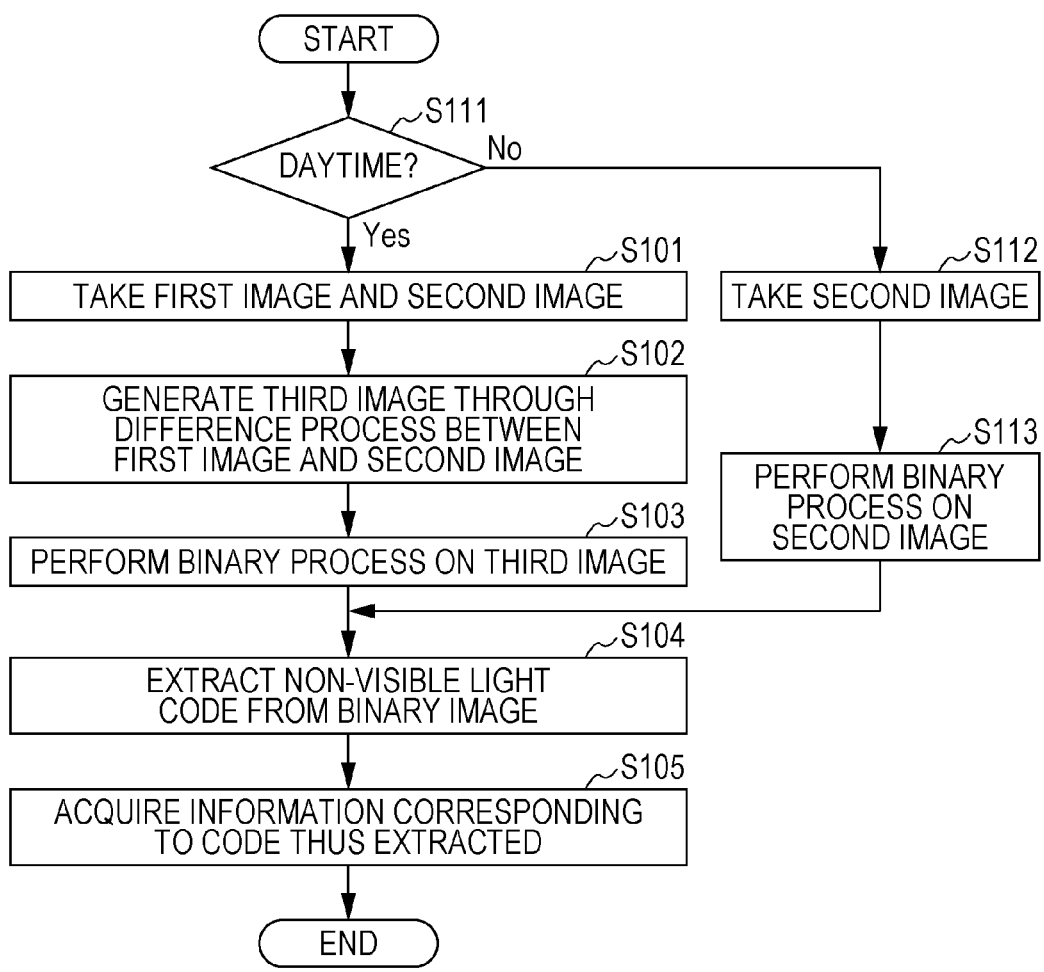
FIG. 21 is a flow chart of an information acquisition process according to the fifth embodiment in which a first image and a second image are simultaneously acquired.

FIG. 21 is a flow chart of an information acquisition process according to the fifth embodiment. The process shown in FIG. 21 differs from the process shown in FIG. 11 in that steps S111 to S113 have been added.

First, the day-or-night determiner 143 determines whether it is daytime or nighttime now (S111). For example, the day-or-night determiner 143 determines whether it is daytime or nighttime now on the basis of a result of detection yielded by an illuminance sensor provided in the vehicle. Alternatively, the day-or-night determiner 143 may determine whether it is daytime or nighttime now on the basis of what time it is now.

In a case where it is daytime now (Yes in S111), step S101 and its subsequent steps are executed as in the case of the process shown in FIG. 11. That is, the difference processor 151 generates a third image 163, and the extractor 152 extracts a code 50 from the third image 163.

On the other hand, in a case where it is nighttime now (No in S111), the image processing device 140B does not generate a third image 163 but extracts a code 50 from a second imager 162. Specifically, the imager 111 takes a second imager 162, and the image processor 142 acquires the second image 162 thus taken (S112). Next, the extractor 152 generates a binary image by performing a binary process on the second image 162 at a predetermined threshold (S113). Next, the extractor 152 extracts a code 50 from the binary image (S104). Then, the extractor 152 acquires information 144 corresponding to the code 50 thus extracted (S105).

During the nighttime, the sun, which is a great source of generation of a non-visible light component, has a small effect. This makes it possible to extract a code with comparatively high accuracy even without performing a difference process. By omitting to perform a difference process in the nighttime, the image processing device 140B can reduce throughput and extract a code at high speed.

It should be noted that although an example of a case where a first image 161 and a second image 162 are simultaneously acquired has been described here, the same applies to a case where a first image 161 and a second image 162 are sequentially acquired. Further, although a description has been given here on the basis of the configuration of the first embodiment, a similar modification is applicable to the configuration of the second, third, or fourth embodiment.

Further, in the first to fifth embodiments, the imaging device 101 may have a global shutter function. That is, the imager 111 uses the plurality of first pixels and the plurality of second pixels to take a first image 161 and a second image 162 during a single period of exposure within a one-frame period. During the period of exposure, exposures of the plurality of first pixels and the plurality of second pixels start and end at the same timings.

Figure 22A:
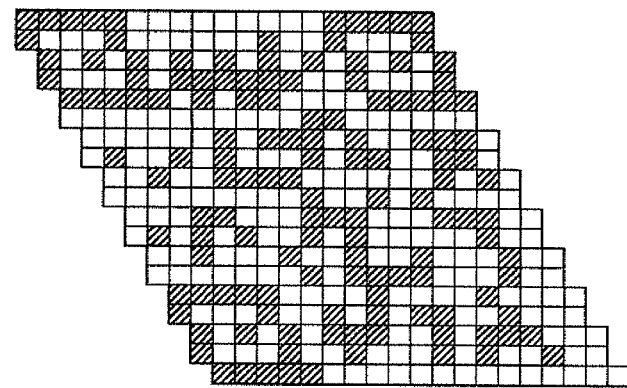
FIG. 22A is a diagram showing an example of an image of a code taken by a rolling shutter operation according to an embodiment.
Figure 22B:
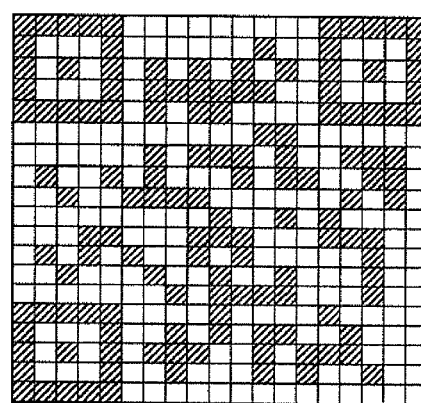
FIG. 22B is a diagram showing an example of an image of the code taken by a global shutter operation according to the embodiment.

FIG. 22A is a diagram showing an example image of a code 50 in an image obtained by a rolling shutter operation. FIG. 22B is a diagram showing an example of an image of the code 50 in an image obtained by a global shutter operation. As shown in FIGS. 22A and 22B, the global shutter operation makes it possible to reduce a distortion of an image of the code 50. For example, even while the vehicle is moving at high speed, the imager 111 can take an image of the code 50 without distortion. This makes it possible to improve the accuracy with which the code 50 is recognized.

Further, in the first to fifth embodiments, the image processor 142 may extract a code with respect to only some of a plurality of frame periods. That is, the imaging device 101 may acquire a first image 161 and a second image 162 in each of the plurality of frame periods, and the image processor 142 may extract the code with respect to only some of the plurality of frame periods.

As noted above, each of the embodiments makes it possible to extract codes 50 such as those shown in FIG. 2 with high accuracy.

Although the foregoing has described systems and apparatuses according to embodiments, the present disclosure is not limited to these embodiments.

For example, the division of functional blocks in a block diagram is merely an example. A plurality of functional blocks may be realized as one functional block. One functional block may be divided into a plurality of functional blocks. Some functions may be transferred to other functional blocks.

Further, the order of execution of steps in a flow chart is intended for illustrative purposes of describing the present disclosure in concrete terms, and the foregoing orders may be changed. Further, some of the steps may be executed at the same time as (in parallel with) other steps.

Further, the processors of the apparatuses according to the foregoing embodiments are realized as LSIs typified by integrated circuits. These LSIs may be individually integrated into one chip, or can also be integrated into one chip including some or all of them.

Further, the integrated circuits are not limited to LSIs but may be realized by dedicated circuits or general-purpose processors. An FPGA (field-programmable gate array) that can be programmed after manufacturing an LSI or a reconfigurable processor that allows reconfiguration of the connection or setup of circuit cells inside the LSI can be used.

Further, in each of the foregoing embodiments, some of the constituent elements may be realized by executing a software program suited to those constituent elements. The constituent elements may be realized by a program executer such as a CPU or a processor reading out and executing a software program stored in a storage medium such as a hard disk or a semiconductor memory.

Although the foregoing has described systems and apparatuses according to one more aspects with reference to embodiments, the present disclosure is not limited to these embodiments. Embodiments based on the application to the present embodiment of various modifications conceived of by persons skilled in the art and embodiments based on combinations of constituent elements of different embodiments are encompassed in the scope of the one or more aspects, provided such embodiments do not depart from the spirit of the present disclosure.

The present disclosure is useful as various imaging devices. Further, the present disclosure can also be used for applications such as digital cameras, digital video cameras, camera-equipped cellular phones, medical cameras such as electronic endoscopes, on-board cameras, and robot cameras.

What is claimed is:

1. An imaging device comprising:
   a first filter that passes a first light and a second light;
   a second filter that blocks the second light;
   photoelectric converters that have sensitivity to the first light and the second light; and
   a processor, wherein
   one of the photoelectric converters detects a light passing through the first filter to generate a first signal,
   one of the photoelectric converters detects a light passing through the first filter and the second filter to generate a second signal, and
   the processor performs the second light sensing based on the first signal and the second signal.

2. The imaging device according to claim 1, wherein the processor performs the second light sensing through a difference processing based on the first signal and the second signal.

3. The imaging device according to claim 1, wherein the one of the photoelectric converters that detects the light passing through the first filter to generate the first signal is same as the one of the photoelectric converters that detects the light passing through the first filter and the second filter to generate the second signal.

4. The imaging device according to claim 1, wherein the first light is a visible light, and the second light is an infrared light.

5. The imaging device according to claim 4, wherein the first filter is a color filter, and the second filter is an infrared cut filter.

6. An imaging device comprising:
   a filter that blocks a first light and that passes a second light, the first light and the second light being included in an incident light;
   photoelectric converters that have sensitivity to the first light and the second light; and
   a processor, wherein
   one of the photoelectric converters detects the incident light not through the filter to generate a first signal,
   one of the photoelectric converters detects the incident light through the filter to generate a second signal, and
   the processor performs a difference processing based on the first signal and the second signal.

7. The imaging device according to claim 6, wherein the processor performs the first light sensing through the difference processing based on the first signal and the second signal.

8. The imaging device according to claim 6, wherein the one of the photoelectric converters that detects the light not passing through the filter to generate the first signal is same as the one of the photoelectric converters that detects the light passing through the filter to generate the second signal.

9. The imaging device according to claim 6, wherein the first light is an infrared light.

10. The imaging device according to claim 9, wherein the filter is an infrared cut filter.

11. A method comprising:
    detecting a light passing through a first filter to generate a first signal, wherein the first filter is configured to pass a first light and a second light;
    detecting a light passing through the first filter and a second filter to generate a second signal, wherein the second filter is configured to block the second light; and
    performing the second light sensing based on the first signal and the second signal.

12. The method according to claim 11, wherein the performing the second light sensing includes a difference processing based on the first signal and the second signal.

13. The method according to claim 11, wherein the first light is a visible light, and the second light is an infrared light.

* * * * *